(12) United States Patent
Rosko et al.

(10) Patent No.: US 7,753,074 B2
(45) Date of Patent: Jul. 13, 2010

(54) MIXING VALVE

(75) Inventors: Michael Scot Rosko, Greenwood, IN (US); Kurt Judson Thomas, Indianapolis, IN (US); Thomas C. Pinette, Indianapolis, IN (US); Joshua R. Barber, New Castle, IN (US)

(73) Assignee: MASCO Corporation of Indiana, Indianapolis, IN (US)

( * ) Notice: Subject to any disclaimer, the term of this patent is extended or adjusted under 35 U.S.C. 154(b) by 272 days.

(21) Appl. No.: 11/494,889

(22) Filed: Jul. 28, 2006

(65) Prior Publication Data

US 2008/0023085 A1    Jan. 31, 2008

(51) Int. Cl.
*F16K 11/06* (2006.01)
*F16K 51/00* (2006.01)

(52) U.S. Cl. .................................. 137/625.4; 251/285

(58) Field of Classification Search ............ 137/625.17, 137/625.4; 251/285; 4/677
See application file for complete search history.

(56) References Cited

U.S. PATENT DOCUMENTS

| 1,224,808 A | | 5/1917 | Sundell et al. |
|---|---|---|---|
| 2,126,443 A | | 8/1938 | Begley |
| 2,200,283 A | | 5/1940 | Lennon |
| 2,849,548 A | | 8/1958 | Young |
| 3,035,612 A | * | 5/1962 | Lyon ............... 137/625.17 |
| 3,056,867 A | | 10/1962 | Eitel |
| 3,072,426 A | | 1/1963 | Gilbert |
| 3,384,119 A | | 5/1968 | Manoogian |
| 3,533,436 A | * | 10/1970 | Parkison ..................... 137/359 |
| 3,589,242 A | | 6/1971 | Peterson et al. |
| 3,645,493 A | | 2/1972 | Manoogian et al. |
| 3,661,180 A | | 5/1972 | Lyon |
| 3,667,503 A | | 6/1972 | Farrell et al. |
| 3,674,048 A | | 7/1972 | Manoogian et al. |
| 3,680,592 A | | 8/1972 | Hayman |
| 3,693,660 A | | 9/1972 | Wheelock |
| 3,698,415 A | | 10/1972 | Forster et al. |
| 3,736,959 A | | 6/1973 | Parkison |
| 3,747,638 A | | 7/1973 | Manoogian et al. |
| 3,766,944 A | | 10/1973 | Distler |
| 3,794,074 A | | 2/1974 | Watts |
| 3,854,493 A | | 12/1974 | Farrell |
| 3,882,897 A | | 5/1975 | Manoogian et al. |
| 3,916,951 A | | 11/1975 | Schmitt |
| 3,938,556 A | | 2/1976 | Hicks |
| 3,951,169 A | | 4/1976 | Loose |
| 3,952,764 A | | 4/1976 | Keller, III |

(Continued)

FOREIGN PATENT DOCUMENTS

DE    3632265    4/1988

(Continued)

OTHER PUBLICATIONS

International Search Report and Written Opinion for PCT/US2007/16827, 9 pages.

(Continued)

*Primary Examiner*—John Fox
(74) *Attorney, Agent, or Firm*—Baker & Daniels LLP

(57) ABSTRACT

The present invention relates generally to fluid control valves and, more particularly, to a mixing valve for use within a faucet.

32 Claims, 27 Drawing Sheets

U.S. PATENT DOCUMENTS

| | | |
|---|---|---|
| 3,958,601 A | 5/1976 | Schmitt |
| 3,965,935 A | 6/1976 | Morisseau |
| 3,965,936 A | 6/1976 | Lyon |
| 4,051,869 A | 10/1977 | Holt et al. |
| 4,084,611 A | 4/1978 | Mahrer |
| 4,088,153 A | 5/1978 | Paasikivi |
| 4,162,386 A | 7/1979 | Bourgeois et al. |
| 4,163,460 A | 8/1979 | Zucchetti |
| 4,164,607 A | 8/1979 | Thiel et al. |
| 4,183,377 A | 1/1980 | Bernat |
| 4,200,123 A | 4/1980 | Brandelli |
| 4,226,260 A | 10/1980 | Schmitt |
| 4,226,899 A | 10/1980 | Thiel et al. |
| 4,242,413 A | 12/1980 | Iwahashi et al. |
| 4,243,063 A | 1/1981 | Parkison |
| 4,258,751 A | 3/1981 | Humpert |
| 4,301,830 A | 11/1981 | Keller, III |
| 4,301,836 A | 11/1981 | Hunziker |
| 4,325,403 A | 4/1982 | Uhlmann |
| 4,327,758 A | 5/1982 | Uhlmann |
| 4,337,795 A | 7/1982 | Argyris et al. |
| 4,362,186 A | 12/1982 | Parkison et al. |
| 4,375,225 A | 3/1983 | Andersson |
| 4,375,824 A | 3/1983 | von Borries et al. |
| 4,378,029 A | 3/1983 | Parkison |
| 4,383,003 A | 5/1983 | Lifshin et al. |
| 4,387,880 A | 6/1983 | Saarisalo et al. |
| 4,397,330 A | 8/1983 | Hayman |
| 4,407,444 A | 10/1983 | Knebel et al. |
| 4,425,935 A | 1/1984 | Gonzalez |
| 4,453,567 A | 6/1984 | MacDonald |
| 4,458,839 A | 7/1984 | MacDonald |
| 4,502,507 A | 3/1985 | Hayman |
| 4,513,781 A | 4/1985 | Nikolayczik |
| 4,535,024 A | 8/1985 | Parker |
| 4,540,023 A | 9/1985 | Pawelzik |
| 4,577,835 A | 3/1986 | Holycross, Jr. |
| 4,586,534 A | 5/1986 | McNeely |
| 4,604,502 A | 8/1986 | Thomas |
| 4,605,200 A | 8/1986 | Huppee |
| 4,606,372 A | 8/1986 | Hayman |
| 4,617,965 A | 10/1986 | Lorch |
| 4,633,906 A | 1/1987 | Tuchman |
| 4,651,774 A | 3/1987 | Oberdörfer |
| 4,653,538 A | 3/1987 | Tsutsui et al. |
| 4,657,045 A | 4/1987 | Kitamura |
| 4,672,999 A | 6/1987 | Knapp |
| 4,676,270 A | 6/1987 | Knapp et al. |
| 4,687,025 A | 8/1987 | Kahle et al. |
| 4,697,620 A | 10/1987 | Bergmann |
| 4,700,928 A | 10/1987 | Marty |
| 4,705,072 A | 11/1987 | Egli |
| 4,707,279 A | 11/1987 | Walls |
| 4,733,688 A | 3/1988 | Lorch |
| 4,733,693 A | 3/1988 | Knapp |
| 4,733,694 A | 3/1988 | Knapp |
| 4,738,281 A | 4/1988 | Limet et al. |
| 4,738,393 A | 4/1988 | Bergmann et al. |
| 4,739,523 A | 4/1988 | Bondar |
| 4,754,783 A | 7/1988 | Knapp |
| 4,765,365 A | 8/1988 | Roland |
| 4,765,368 A | 8/1988 | Mutti et al. |
| 4,768,552 A | 9/1988 | Stella |
| 4,768,557 A | 9/1988 | Holzer |
| 4,768,749 A | 9/1988 | Oberdörfer |
| 4,770,208 A | 9/1988 | Stella |
| 4,782,853 A | 11/1988 | Moen |
| 4,793,375 A | 12/1988 | Marty |
| 4,794,952 A | 1/1989 | Burkard |
| 4,796,666 A | 1/1989 | Bergmann |
| 4,819,867 A | 4/1989 | Delpla et al. |
| 4,823,841 A | 4/1989 | Graber |
| 4,838,304 A | 6/1989 | Knapp |
| 4,842,191 A | 6/1989 | Bergmann |
| 4,854,347 A | 8/1989 | Knapp |
| 4,854,498 A | 8/1989 | Stayton |
| 4,856,556 A | 8/1989 | Mennigmann |
| 4,883,090 A | 11/1989 | Kitamura et al. |
| 4,887,642 A | 12/1989 | Bernat |
| 4,901,749 A | 2/1990 | Hutto |
| 4,932,433 A | 6/1990 | Knapp |
| 4,932,438 A | 6/1990 | Kitamura et al. |
| 4,938,999 A | 7/1990 | Jenkin |
| 4,941,506 A | 7/1990 | Bergmann |
| 4,942,902 A | 7/1990 | Knapp |
| 4,957,135 A | 9/1990 | Knapp |
| 4,960,154 A | 10/1990 | Dagiantis |
| 4,971,112 A | 11/1990 | Knapp |
| 4,971,113 A | 11/1990 | Pawelzik et al. |
| 4,986,306 A | 1/1991 | Ferrari |
| 4,995,419 A | 2/1991 | Pawelzik et al. |
| 4,997,005 A | 3/1991 | Pawelzik et al. |
| 5,022,429 A | 6/1991 | Rollini et al. |
| 5,060,692 A | 10/1991 | Pawelzik et al. |
| 5,070,906 A | 12/1991 | Orlandi |
| 5,080,134 A | 1/1992 | Orlandi |
| 5,095,934 A | 3/1992 | Iqbal |
| 5,100,565 A | 3/1992 | Fujiwara et al. |
| 5,123,437 A | 6/1992 | Egli et al. |
| 5,170,816 A | 12/1992 | Schnieders |
| 5,175,929 A | 1/1993 | Anthony et al. |
| 5,190,077 A | 3/1993 | Pawelzik et al. |
| 5,195,555 A | 3/1993 | Knapp |
| 5,204,507 A | 4/1993 | Saeda et al. |
| 5,213,134 A | 5/1993 | Orlandi |
| 5,217,589 A | 6/1993 | Arledge et al. |
| 5,232,022 A | 8/1993 | Gougouyan |
| 5,234,020 A | 8/1993 | Orlandi |
| 5,293,900 A | 3/1994 | Karbassi et al. |
| 5,295,513 A | 3/1994 | Hori |
| 5,303,736 A | 4/1994 | Orlandi |
| 5,303,737 A | 4/1994 | Koch |
| 5,308,040 A | 5/1994 | Torres |
| 5,326,075 A * | 7/1994 | Goff ........................... 251/285 |
| 5,329,957 A | 7/1994 | Semchuck et al. |
| 5,329,958 A | 7/1994 | Bosio |
| 5,331,997 A | 7/1994 | Bosio |
| 5,340,018 A | 8/1994 | MacDonald |
| 5,341,845 A | 8/1994 | Graber |
| 5,342,018 A | 8/1994 | Wu |
| 5,355,906 A | 10/1994 | Marty et al. |
| 5,372,161 A | 12/1994 | Bechte |
| 5,375,624 A | 12/1994 | Knapp |
| 5,382,471 A | 1/1995 | Arledge et al. |
| 5,386,852 A | 2/1995 | Bosio |
| 5,402,819 A | 4/1995 | Bosio |
| 5,402,827 A | 4/1995 | Gonzalez |
| 5,413,144 A | 5/1995 | Riis |
| 5,417,735 A | 5/1995 | McGarry |
| 5,486,174 A | 1/1996 | Fournet-Fayard et al. |
| 5,490,540 A | 2/1996 | Vom Dahl et al. |
| 5,494,077 A | 2/1996 | Enoki et al. |
| 5,501,244 A | 3/1996 | Shahriar |
| 5,505,225 A | 4/1996 | Niakan |
| 5,535,943 A | 7/1996 | Kahle et al. |
| 5,538,041 A | 7/1996 | Gänzle |
| 5,542,449 A | 8/1996 | Huang |
| 5,559,432 A | 9/1996 | Logue |
| 5,570,720 A | 11/1996 | Riis |
| 5,592,971 A | 1/1997 | Knapp |
| 5,609,188 A | 3/1997 | Oberdörfer |
| 5,647,530 A | 7/1997 | Lorch |
| 5,655,566 A | 8/1997 | Tres Casas |
| 5,657,791 A | 8/1997 | Graber |

| | | | | | | |
|---|---|---|---|---|---|---|
| 5,692,541 A | 12/1997 | Brown | | 6,248,401 B1 | 6/2001 | Chiang et al. |
| 5,709,957 A | 1/1998 | Chiang et al. | | 6,268,060 B1 | 7/2001 | Mokerji |
| 5,725,010 A | 3/1998 | Marty et al. | | 6,271,828 B1 | 8/2001 | Rosenberg et al. |
| 5,730,176 A | 3/1998 | Heimann et al. | | 6,277,494 B1 | 8/2001 | Mokerji |
| 5,743,297 A | 4/1998 | Mueller | | 6,293,299 B1 | 9/2001 | Nelson |
| 5,755,261 A | 5/1998 | Fukuzawa et al. | | 6,298,875 B1 | 10/2001 | Warshawsky et al. |
| 5,806,552 A | 9/1998 | Martin, Jr. | | 6,300,937 B1 | 10/2001 | Rosenberg |
| 5,810,050 A | 9/1998 | Pickerrell et al. | | 6,321,786 B2 | 11/2001 | Schumacher |
| 5,829,735 A | 11/1998 | Ikeda | | 6,325,089 B1 | 12/2001 | Breda |
| 5,839,464 A | 11/1998 | O'Hara et al. | | 6,339,979 B1 | 1/2002 | Chiang |
| 5,853,023 A | 12/1998 | Orlandi et al. | | 6,341,731 B1 | 1/2002 | Knapp |
| 5,857,489 A | 1/1999 | Chang | | 6,346,327 B1 | 2/2002 | Mokerji |
| 5,879,532 A | 3/1999 | Foster et al. | | 6,363,969 B1 | 4/2002 | Schneider |
| 5,887,620 A | 3/1999 | Niwa et al. | | 6,386,233 B1 | 5/2002 | Magocsi |
| 5,896,601 A | 4/1999 | Humpert et al. | | 6,391,457 B1 | 5/2002 | Welty et al. |
| 5,899,230 A | 5/1999 | Orlandi | | 6,394,133 B1 | 5/2002 | Knapp |
| 5,904,291 A | 5/1999 | Knapp | | 6,405,756 B2 | 6/2002 | Creswell et al. |
| 5,922,478 A | 7/1999 | Welty et al. | | 6,409,413 B1 | 6/2002 | Bieg et al. |
| 5,931,374 A | 8/1999 | Knapp | | 6,429,849 B1 | 8/2002 | An et al. |
| 5,937,897 A | 8/1999 | Chatterjea et al. | | 6,439,581 B1 | 8/2002 | Chang |
| 5,948,548 A | 9/1999 | Welty et al. | | 6,484,753 B1 | 11/2002 | Shimizu et al. |
| 5,952,085 A | 9/1999 | Rickerby et al. | | 6,575,196 B1 | 6/2003 | Creswell |
| 5,960,828 A | 10/1999 | Grohe et al. | | 6,634,380 B2 | 10/2003 | Bartkus et al. |
| 5,983,938 A | 11/1999 | Bowers et al. | | 6,640,357 B1 | 11/2003 | Chang |
| 5,983,939 A | 11/1999 | Heimann et al. | | 6,913,203 B2 | 7/2005 | DeLangis |
| 5,992,457 A | 11/1999 | Humpert et al. | | 6,920,899 B2 | 7/2005 | Haenlein et al. |
| 6,029,699 A | 2/2000 | Granot | | 6,981,693 B1 | 1/2006 | Chang |
| 6,032,686 A | 3/2000 | O'Hara et al. | | 7,032,272 B2 | 4/2006 | Haenlein |
| 6,033,790 A | 3/2000 | Welty et al. | | 7,108,012 B2 | 9/2006 | Rosko et al. |
| 6,045,118 A | 4/2000 | Knapp | | 7,137,410 B2 | 11/2006 | Rosko |
| 6,050,285 A | 4/2000 | Goncze et al. | | 2001/0001436 A1 | 5/2001 | Foster et al. |
| 6,090,490 A | 7/2000 | Mokerji | | 2001/0011558 A1 | 8/2001 | Schumacher |
| 6,096,426 A | 8/2000 | Mokerji | | 2001/0029984 A1 | 10/2001 | Creswell et al. |
| 6,103,381 A | 8/2000 | Mokerji | | 2002/0148516 A1 | 10/2002 | Bartkus et al. |
| 6,123,105 A | 9/2000 | Yang | | 2004/0187261 A1 | 9/2004 | Haenlein |
| 6,131,600 A | 10/2000 | Change | | 2004/0231735 A1 | 11/2004 | Haenlein et al. |
| 6,131,611 A | 10/2000 | Knapp | | 2006/0016491 A1 | 1/2006 | Rosko et al. |
| 6,132,889 A | 10/2000 | Welty et al. | | 2006/0022062 A1 | 2/2006 | Morris |
| 6,135,152 A | 10/2000 | Knapp | | 2006/0037650 A1 | 2/2006 | Huang |
| 6,143,424 A | 11/2000 | Jonte et al. | | 2006/0042704 A1 | 3/2006 | Rosko |
| 6,155,297 A | 12/2000 | MacAusland et al. | | | | |
| 6,156,379 A | 12/2000 | Terada et al. | | | | |

FOREIGN PATENT DOCUMENTS

| | | |
|---|---|---|
| EP | 0 311 546 | 4/1989 |
| EP | 0 665 394 | 8/1995 |
| EP | 0 855 544 | 7/1998 |
| GB | 579542 | 8/1946 |
| WO | WO 03/060621 | 7/2003 |

OTHER PUBLICATIONS

International Preliminary Report on Patentability for PCT/US2007/016278 issued by the PCT International Preliminary Examining Authority on Feb. 9, 2009.

* cited by examiner

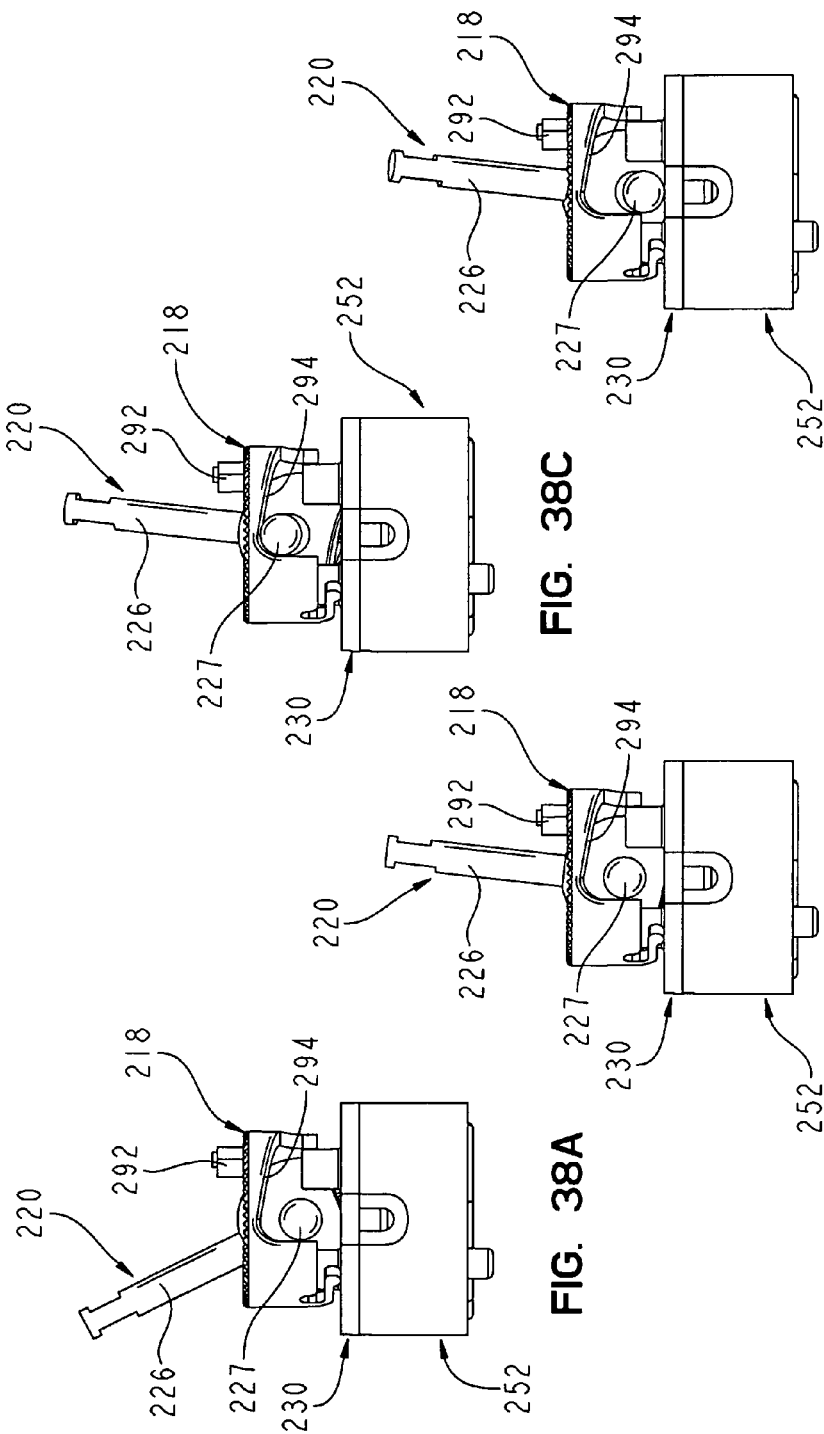

MIXING VALVE

BACKGROUND AND SUMMARY OF THE INVENTION

The present invention relates generally to fluid control valves and, more particularly, to a mixing valve for use within a faucet.

Single-handle water faucet control valves are well known in the art and have been offered with different mechanical structures for controlling the available directions of travel, the ranges of motion, and the type or style of motion for the handle. One such known style of control valve includes a handle that is moved in a generally sideways (left-to-right and right-to-left) direction in order to adjust the mix of hot and cold water for a desired temperature. With this style of water faucet valve control arrangement, the handle is typically moved in an upward or forward direction, away from the user, to increase the flow rate and the volume of water delivered. The handle is typically moved in a downward or rearward direction, toward the user, in order to reduce the flow rate and volume of water, or to completely shut off the flow of water delivered from the faucet.

Known single-handled control valves are often referred to as having a joy stick control handle due to the single-handle construction and the manner in which the handle may be moved. The directions and ranges of motion are controlled by the internal structure of the valve mechanism and by the selection and arrangement of the component parts. It is further known to provide a water faucet control valve that is constructed and arranged to independently control the temperature and the flow rate of the water delivered to a use location by a single-handle or control lever. Illustrative examples of single-handled faucet control valves are described in U.S. Pat. No. 6,920,899, and U.S. patent application Ser. No. 11/444,228, filed May 31, 2006, the disclosures of which are expressly incorporated by reference herein.

One illustrative embodiment of the present invention includes a valve assembly for controlling water flow in a faucet, the valve assembly including a valve body having hot and cold water inlets and an outlet. A lower disc includes first, second, and third ports corresponding to the hot and cold water inlets and the outlet, and is supported by the valve body. An upper disc includes upper and lower surfaces, the lower surface being positioned in engagement with the lower disc and including a peripheral channel for selective communication with the first, second, and third ports.

Another illustrative embodiment of the present invention includes a valve assembly for controlling water flow in a faucet, the valve assembly including a valve body having an inlet and an outlet. A valve mechanism is configured to selectively control the flow of the water from the inlet to the outlet, the valve mechanism being positioned in the valve body. An upper housing includes an interior cavity. A ball includes a stem and two extensions extending laterally from the ball. The ball is adapted to be positioned in the interior cavity of the upper housing and to move through a range of motion. A coupling member is configured to couple to the upper housing to secure the ball, and includes a cavity configured to cooperate with the ball and a plurality of tabs extending toward the upper housing. The tabs are positioned adjacent to the extensions of the ball and defining a continuous glide surface along the range of motion of the ball.

A further illustrative embodiment of the present invention includes a valve assembly for controlling water flow in a faucet, the valve assembly including a valve body having an inlet and an outlet. A plurality of discs are configured to control the flow of water through the valve body from the inlet to the outlet. An upper housing includes a body defining an interior cavity and a flexible arcuate rib extending from the body into the cavity. A coupling member is configured to couple to the upper housing. A ball includes a stem and is positioned between the upper housing and the coupling member in the interior cavity in engagement with the flexible arcuate rib. The ball is configured to actuate at least one of the plurality of discs to selectively control the flow of water through the valve assembly.

Another illustrative embodiment of the present invention includes a valve assembly for controlling water flow in a faucet, the valve assembly including a valve body including an interior cavity. Hot and cold water inlets and an outlet are in communication with the interior cavity. The valve assembly further includes an upper housing including a valve actuator, a lower housing, and a lower disc positioned in the lower housing. The lower disc includes a plurality of ports corresponding to the hot and cold inlets and the outlet. An upper disc is positioned above the lower disc and includes upper and lower surfaces, the lower surface including a first channel configured to interact with the plurality of ports, and the upper surface including an aperture extending therethrough and at least one depression. A carrier is positioned above the upper disc and is configured to cooperate with the upper disc such that the aperture causes water to exert pressure against the upper surface of the upper disc to create a pressure reversing hydrobalance. The carrier is adapted to interact with the valve actuator, and a bonnet nut is adapted to couple to the valve body. The bonnet nut is configured to secure the upper and lower housings in the interior cavity of the valve body.

A further illustrative embodiment of the present invention includes a valve assembly for controlling water flow in a faucet, the valve assembly having a valve body having an interior cavity and an inlet and an outlet in communication with the interior cavity. A valve mechanism includes an upper housing having a valve actuator and a lower housing coupled to the upper housing. The upper housing includes an outer flange positioned above the valve body, and the lower housing includes a valve actuated by the valve actuator. The valve mechanism is positioned within the interior cavity of the valve body, and a bonnet nut is adapted to couple to the valve body and to secure the valve mechanism in the interior cavity of the valve body. The bonnet nut includes an interior ridge adapted to contact the outer flange of the upper housing to provide a separation between the bonnet nut and the valve body.

Another illustrative embodiment of the present invention includes a valve assembly for controlling water flow in a faucet, the valve assembly including a valve body having an interior cavity, hot and cold water inlets in communication with the interior cavity, and a water outlet in communication with the interior cavity. A valve mechanism includes an upper housing having a valve actuator and a lower housing coupled to the upper housing. The lower housing includes an upper disc and a lower disc, the lower disc including a plurality of ports cooperating with the hot and cold water inlets and the water outlet. The upper disc is configured to be actuated by the valve actuator to selectively allow water flow in the faucet. The valve mechanism is positioned within the interior cavity of the valve body. A single sealing surface is positioned in the interior cavity of the valve body between the valve body and the valve mechanism, the sealing surface being in contact with the lower disc.

Additional features and advantages of the present invention will become apparent to those skilled in the art upon consideration of the following detailed description of the illustrative embodiment exemplifying the best mode of carrying out the invention as presently perceived.

BRIEF DESCRIPTION OF THE DRAWINGS

The detailed description of the drawings particularly refers to the accompanying figures in which:

FIG. 38A is a side elevational view of the valve assembly of FIG. 36, with the temperature limiting member shown in a high limit position and the stem shown in a fully-closed position;

FIG. 38B is a side elevational view similar to FIG. 38A, with the stem shown in an open mixed water position;

FIG. 38C is a side elevational view similar to FIG. 38A, with the stem shown in an open hot limit position; and FIG. 38D is a side elevational view similar to FIG. 38A, with the stem shown in an open cold limit position.

DETAILED DESCRIPTION OF THE DRAWINGS

The embodiments of the invention described herein are not intended to be exhaustive or to limit the invention to precise forms disclosed. Rather, the embodiment selected for description have been chosen to enable one skilled in the art to practice the invention. Although the disclosure is described in connection with water, it should be understood that additional types of fluids may be substituted therefor.

Figure 1:
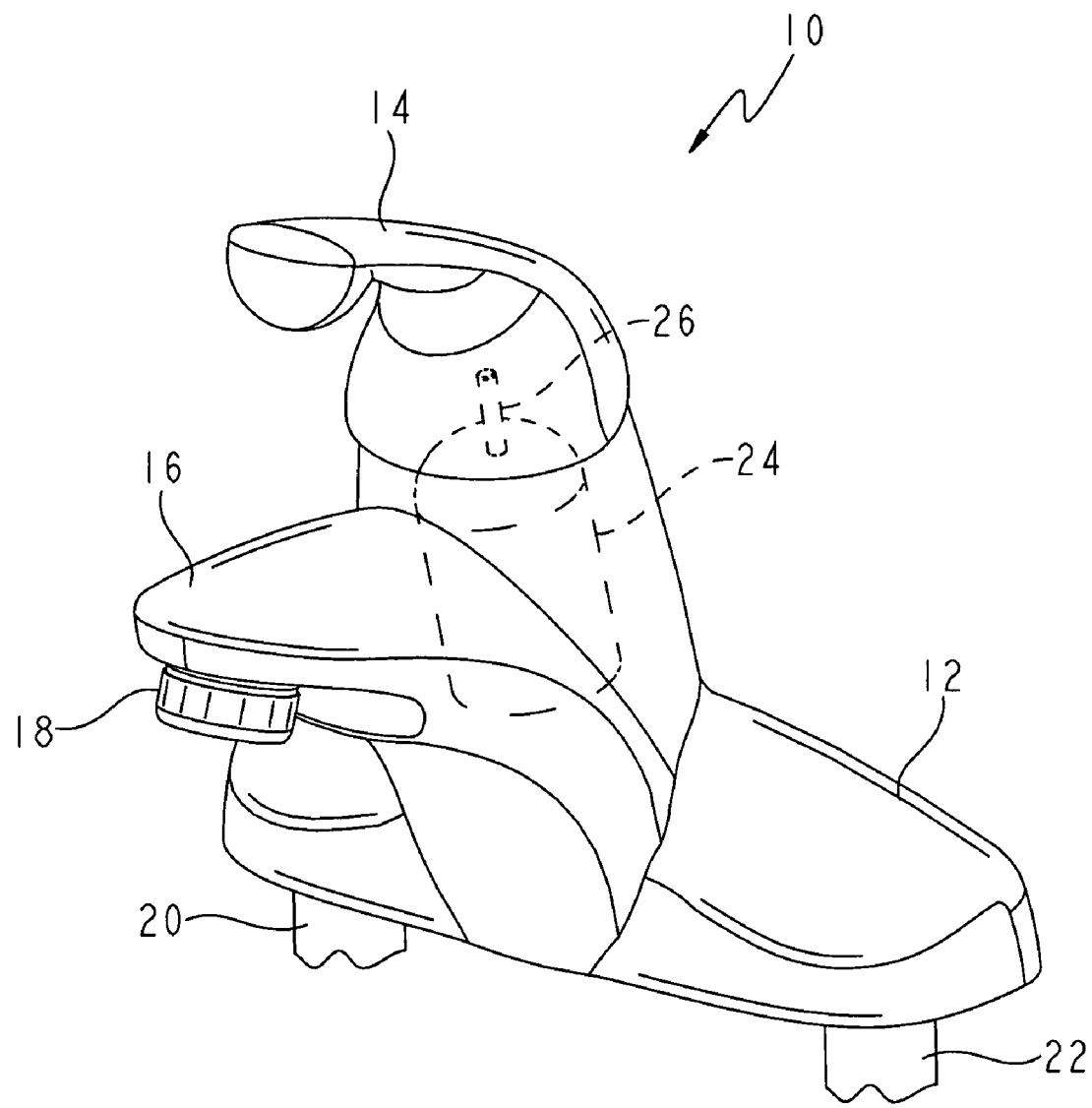
FIG. 1 is a perspective view of a faucet including an illustrative embodiment valve assembly shown in phantom.

Referring initially to FIG. 1, a faucet assembly 10, having a hot water supply conduit 20 and a cold water supply conduit 22, is shown. Faucet assembly 10 includes a delivery spout 16, an aerator 18, a base 12, a handle 14, and a valve assembly 24. Valve assembly 24 includes a stem 26 that may be actuated by handle 14 to selectively allow variable temperature and flow rate of water to be supplied to spout 16 from supply conduits 20 and 22.

Figure 2:
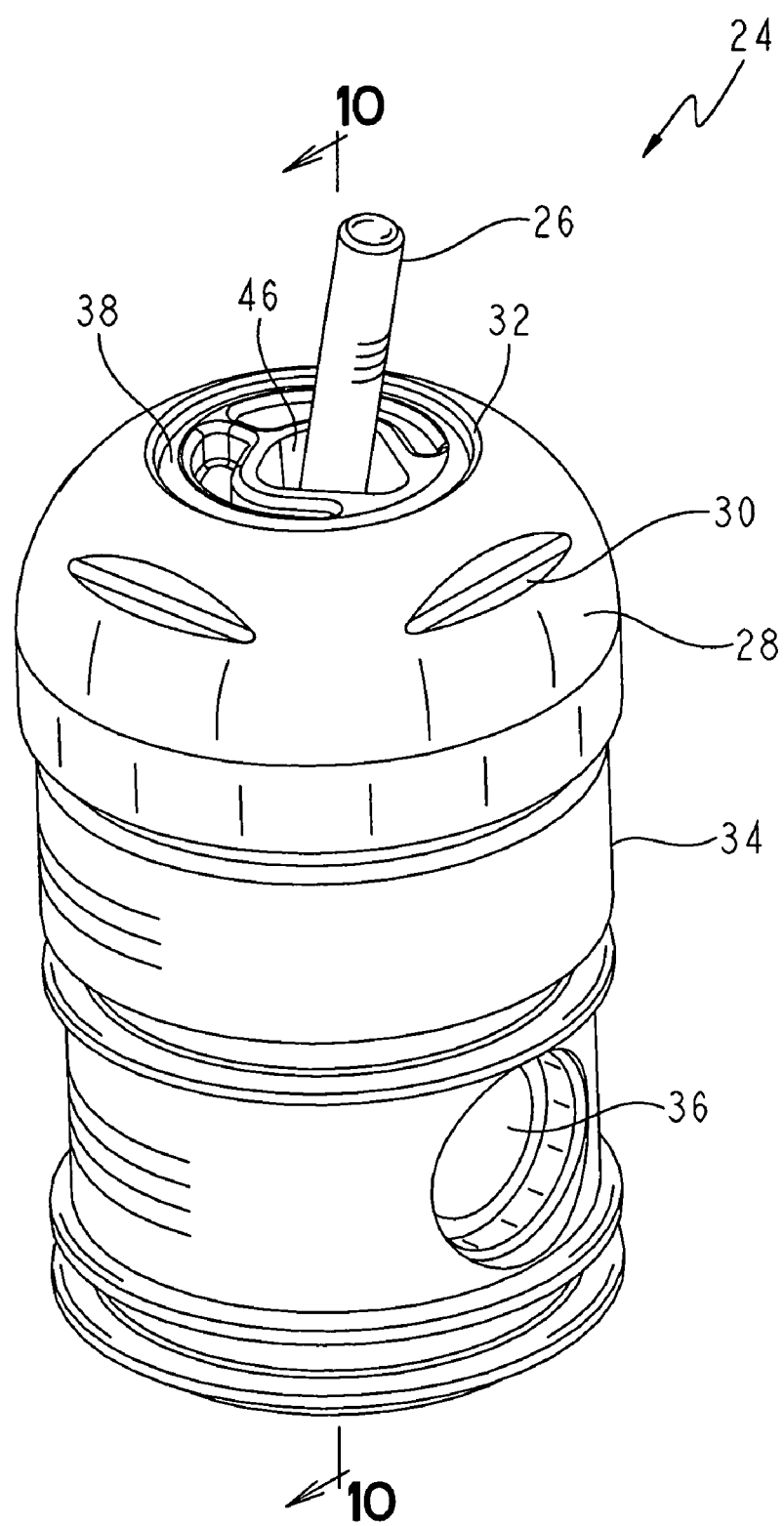
FIG. 2 is a perspective view of the illustrative embodiment valve assembly of FIG. 1.
Figure 10:
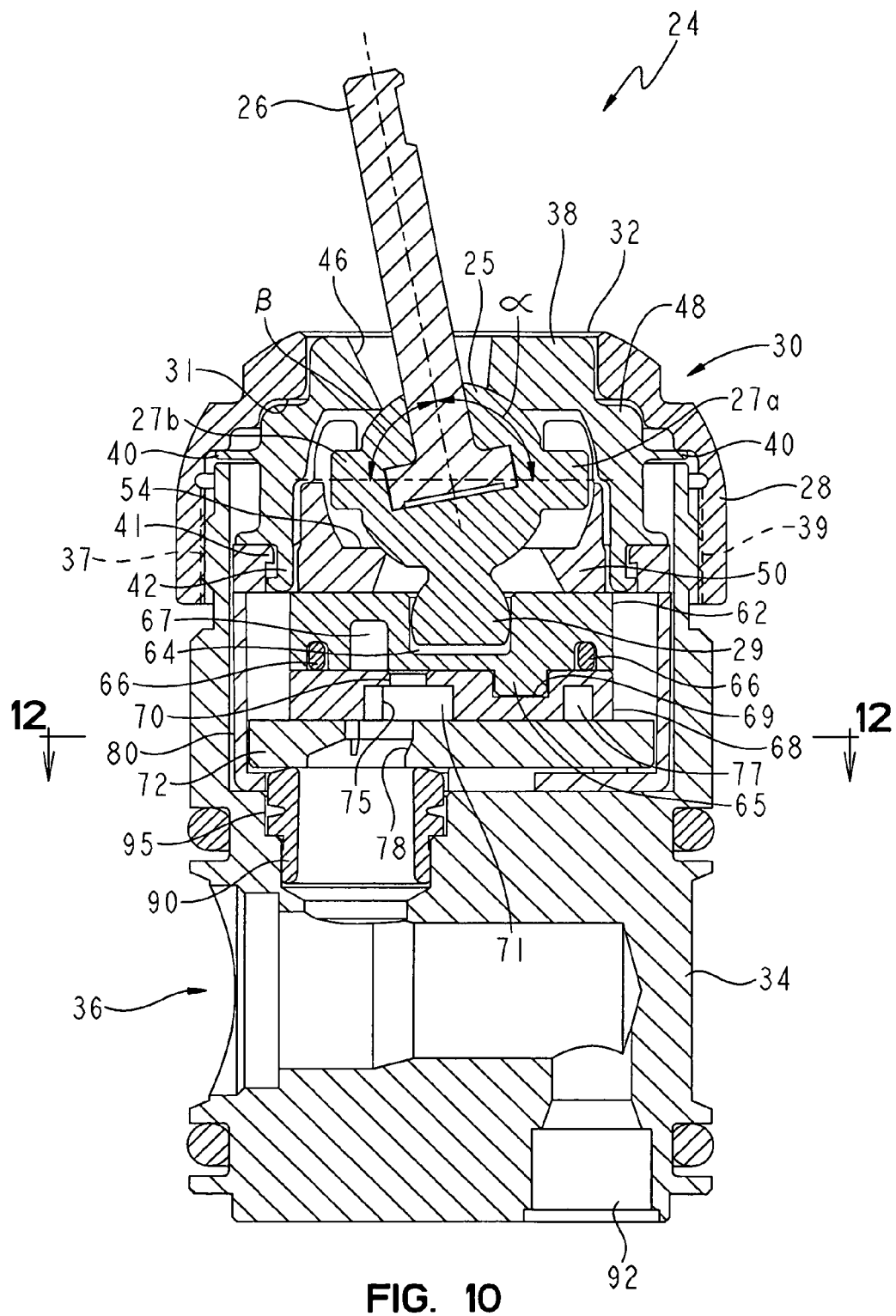
FIG. 10 is a cross-sectional view of the valve assembly taken along lines 10-10 of FIG. 2 with the valve assembly in the partially open orientation.

Referring now to FIG. 2, valve assembly 24 is shown. Valve assembly 24 includes holder, illustratively valve body 34, and bonnet nut 28. In this embodiment, valve body 34 and bonnet nut 28 are constructed of brass, however any suitable material may be used. Valve body 34 extends along a longitudinal axis 33 (FIG. 3) and includes outlet bore 36 which may be operably coupled to an outlet supply line which, in turn, may be coupled to a spout 16, such as the one shown in FIG. 1, or any other suitable fluid delivery device, such as a hand sprayer. Bonnet nut 28 includes internal threads 39 that correspond to external threads 37 of valve body 34 (FIG. 10). Bonnet nut 28 also includes grooves 30 positioned to accept a wrench (not shown) to secure bonnet nut 28 to valve body 34. Bonnet nut 28 further includes a central aperture 32 into which an upper housing 38 extends. Stem 26 extends through aperture 46 of upper housing 38. In this embodiment, aperture 46 is substantially diamond-shaped to limit the movement of stem 26, however any suitably shaped aperture may be used.

Referring now to FIGS. 3-9, the internal components of valve assembly 24 are shown. Valve assembly 24 includes valve body 34, lower housing 80, lower disc or first sealing member 72, upper disc or second sealing member 68, carrier 62, coupling member 50, stem assembly 23, upper housing 38, and bonnet nut 28. The exterior portion of upper housing 38 includes a shoulder portion 48, a flange 40, extensions 44, and tabs 42. Flange 40 extends circumferentially around portions of upper housing 38, and is positioned between bonnet nut 28 and valve body 34 when bonnet nut 28 is threaded onto valve assembly 34. As such, bonnet nut 28 provides a compressive force on flange 40 and upper housing 38. Flange 40 also provides a barrier between bonnet nut 28 and valve body 34 to prevent corrosion and seizing therebetween. In certain embodiments, shoulder portion 48 may be configured to contact interior ridge 31 of bonnet nut 28 to compress upper housing 38 when valve assembly 24 is assembled. Illustratively, upper housing 38 is constructed of plastic, however any other suitable materials may be used to construct the components.

Figure 6:
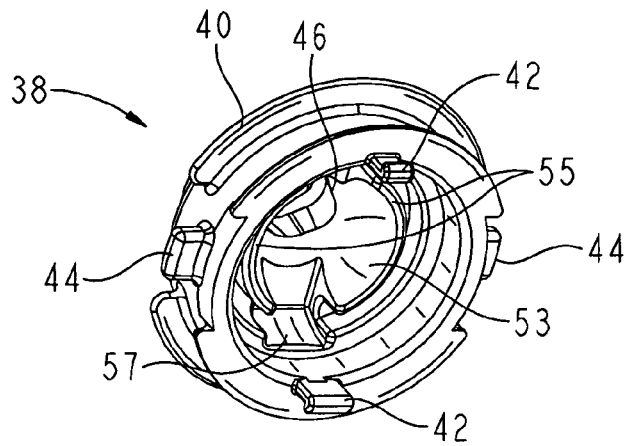
FIG. 6 is a bottom perspective view of the upper housing of the valve assembly shown in FIGS. 2-5.
Figure 7:
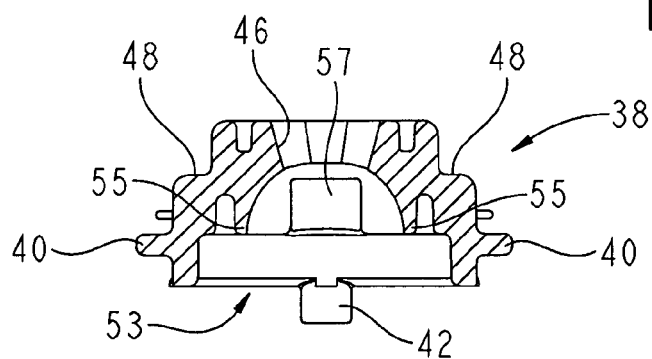
FIG. 7 is a cross-sectional view of the upper housing shown in FIG. 6.
Figure 8:
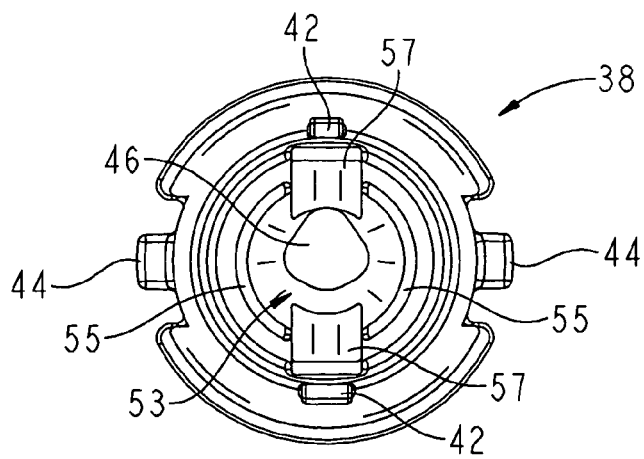
FIG. 8 is a bottom plan view of the upper housing shown in FIGS. 6 and 7.

Valve assembly 24 also includes stem assembly 23 which includes ball 25, stem 26, lateral extensions 27a, 27b, and longitudinal extension or knuckle 29. In the illustrative embodiment, a first angle $\alpha$ defined between the longitudinal axis of stem 26 and an axis defined by extension 27a is greater than ninety degrees, and a second angle $\beta$ defined between the longitudinal axis of stem 26 and the axis defined by extension 27b is less than ninety degrees (FIG. 10). However, it should be appreciated that stem 26 may be positioned at any suitable angle relative to extensions 27a and 27b. Stem assembly 23 is positioned between upper housing 38 and coupling member 50 so that stem 26 extends through aperture 46 in upper housing 38 and ball 25 is positioned in interior cavity 53 of upper housing 38 (FIG. 6). Referring now to FIGS. 6-8, upper housing 38 includes interior cavity 53, opposing arcuate flexible ribs 55, and opposing relief portions 57. Arcuate flexible ribs 55 extend from interior cavity 53 and provide a compressive force on ball 25 when valve assembly 24 is fully assembled.

Figure 3:
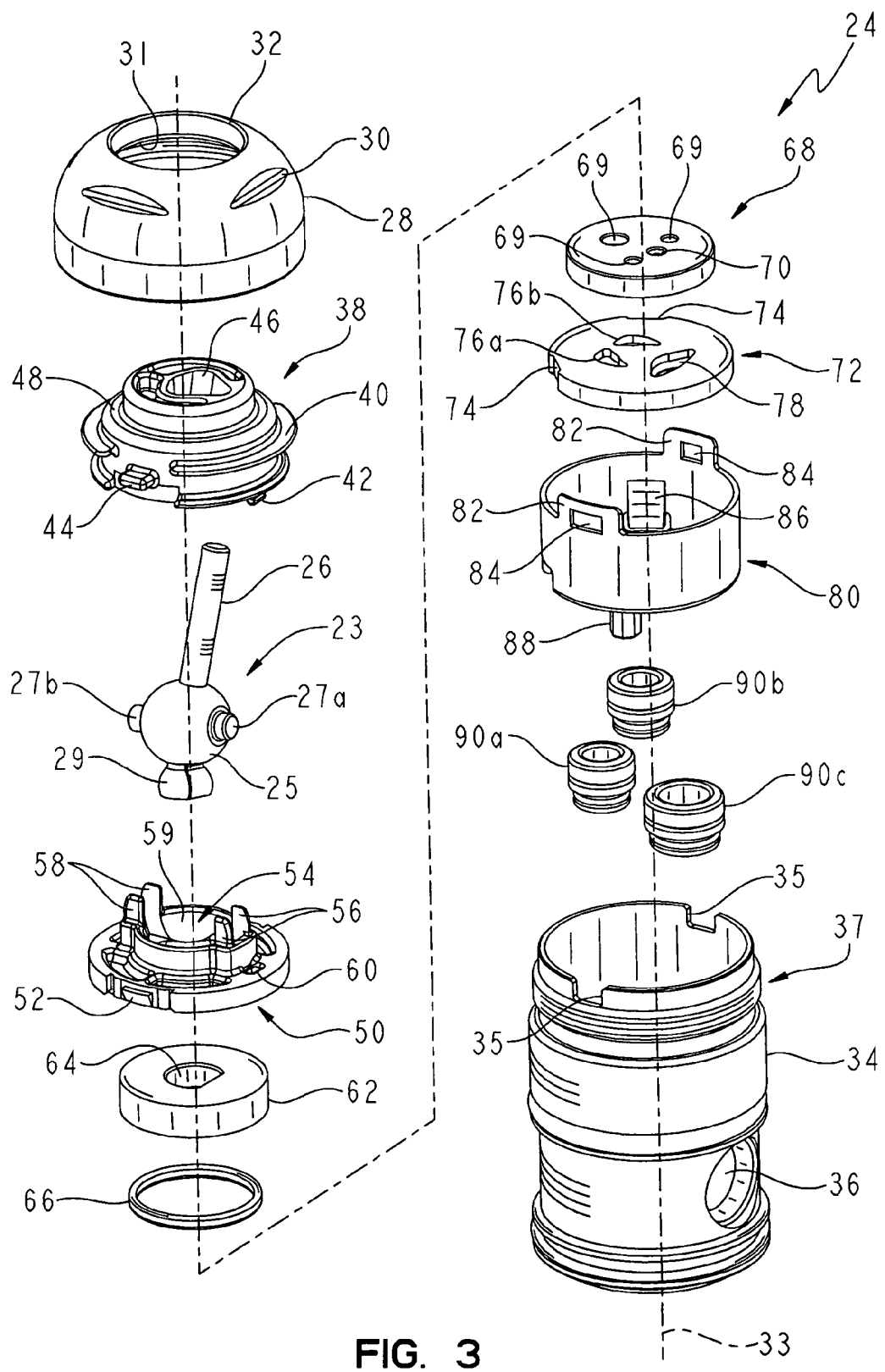
FIG. 3 is an exploded perspective view of the valve assembly shown in FIG. 2.
Figure 9:
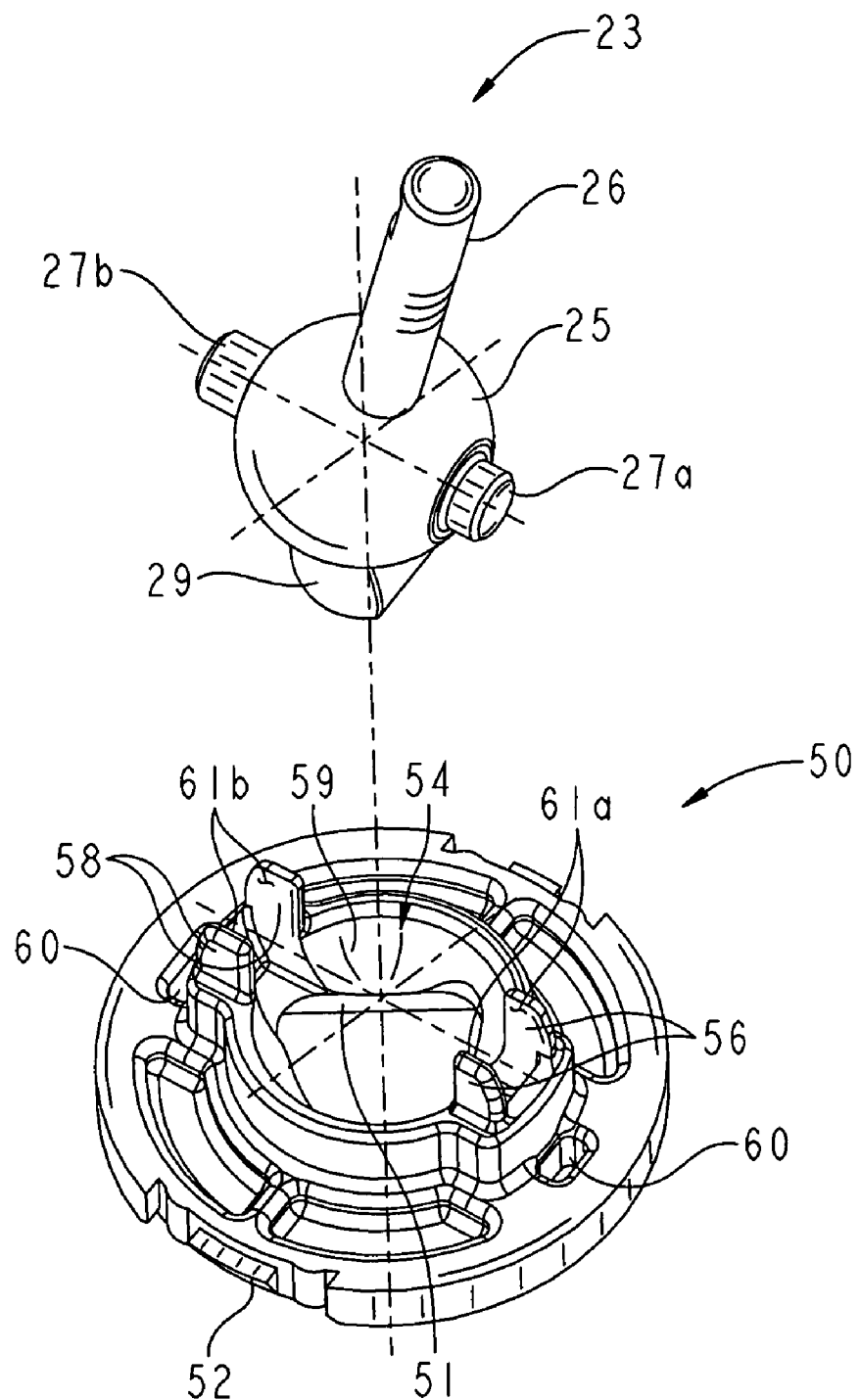
FIG. 9 is an exploded perspective view of the stem assembly and the coupling member of the valve assembly shown in FIGS. 2-5.

Referring now to FIGS. 3 and 9, coupling member 50 includes circumferentially spaced projections 52 and apertures 60 positioned radially outwardly from cavity 54. Aperture 51 is positioned at the bottom of cavity 54 which is formed by arcuate surface 59. Illustratively, aperture 51 is of a substantially triangular shape. Apertures 60 are positioned to accept tabs 42 of upper housing 38 to couple stem assembly 23 between upper housing 38 and coupling member 50. Tabs 42 each include a latch or lip 43 configured to cooperate with a notch 41 of each aperture 60 for locking engagement therebetween (FIGS. 6 and 10). Projections 52 are positioned to secure coupling member 50 to lower housing 80 (as shown in FIG. 3), which is discussed below.

Coupling member 50 also includes a first pair of tabs 56 and a second pair of tabs 58 that extend upwardly from cavity 54. When assembled, ball 25 is positioned in cavity 54 and extensions 27a and 27b are positioned between first pair of tabs 56 and second pair of tabs 58, respectively, as shown in FIG. 9. First and second pairs of tabs 56 and 58 are positioned adjacent to extensions 27a and 27b of stem assembly 23 and define opposing continuous glide surfaces 61a and 61b along the range of motion of ball 25 of stem assembly 23. In operation, extensions 27a and 27b glide along the surfaces 61a and 61b, respectively, of tabs 56 and 58 during movement of stem 26 to operate valve assembly 24.

Referring now to FIG. 6-9, when assembled, relief portions 57 of upper housing 38 accept first and second pairs of tabs 56 and 58 of coupling number 50. As shown in FIG. 3, stem assembly 23 is positioned between upper housing 38 and coupling number 50. As discussed above, extensions 27a and 27b of stem assembly 23 are positioned between first pair of tabs 56 and second pair of tabs 58 of coupling member 50. Stem 26 extends through aperture 46 in upper housing 38. First pair of tabs 56 and second pair of tabs 58 are positioned in relief portions 57 of upper housing 38. An upper portion of ball 25 of stem assembly 23 is contacted by arcuate flexible ribs 55 of upper housing 38, and a lower portion of ball 25 is contacted by arcuate surface 59 of coupling member 50. Tabs 42 interact or "snap fit" within openings 60 in coupling member 50 to secure stem assembly 23 between upper housing 38 and coupling member 50. Longitudinal projection 29 extends through aperture 51 in coupling number 50.

Figure 4:
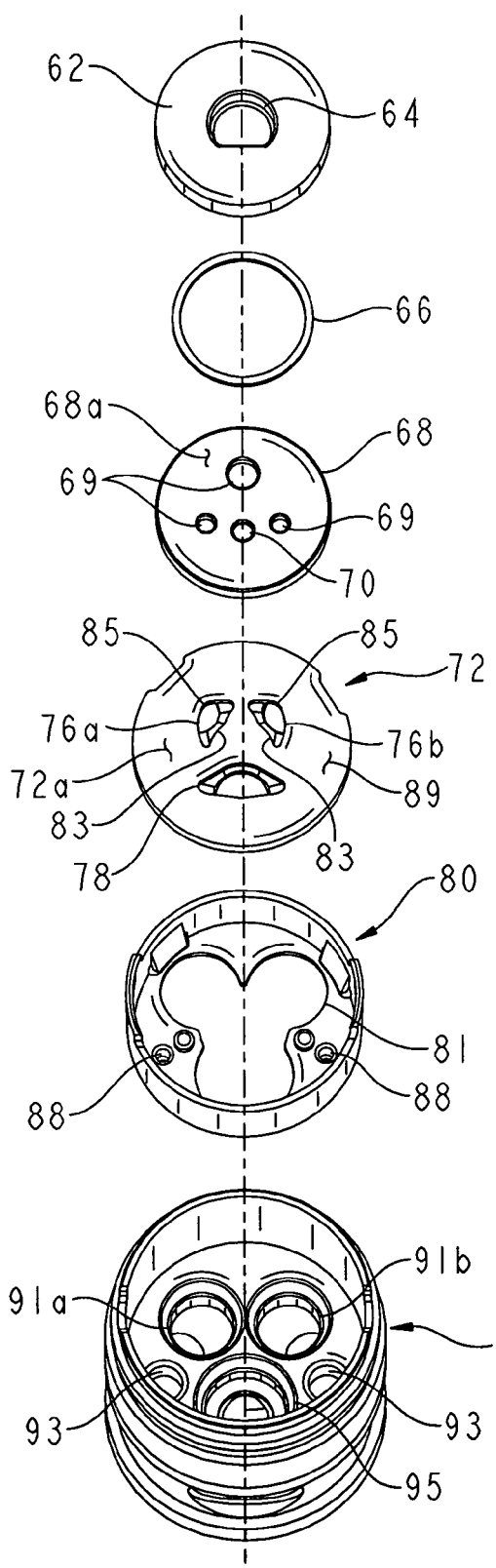
FIG. 4 is an exploded upper perspective view of internal components of the valve assembly shown in FIGS. 2 and 3.
Figure 5:
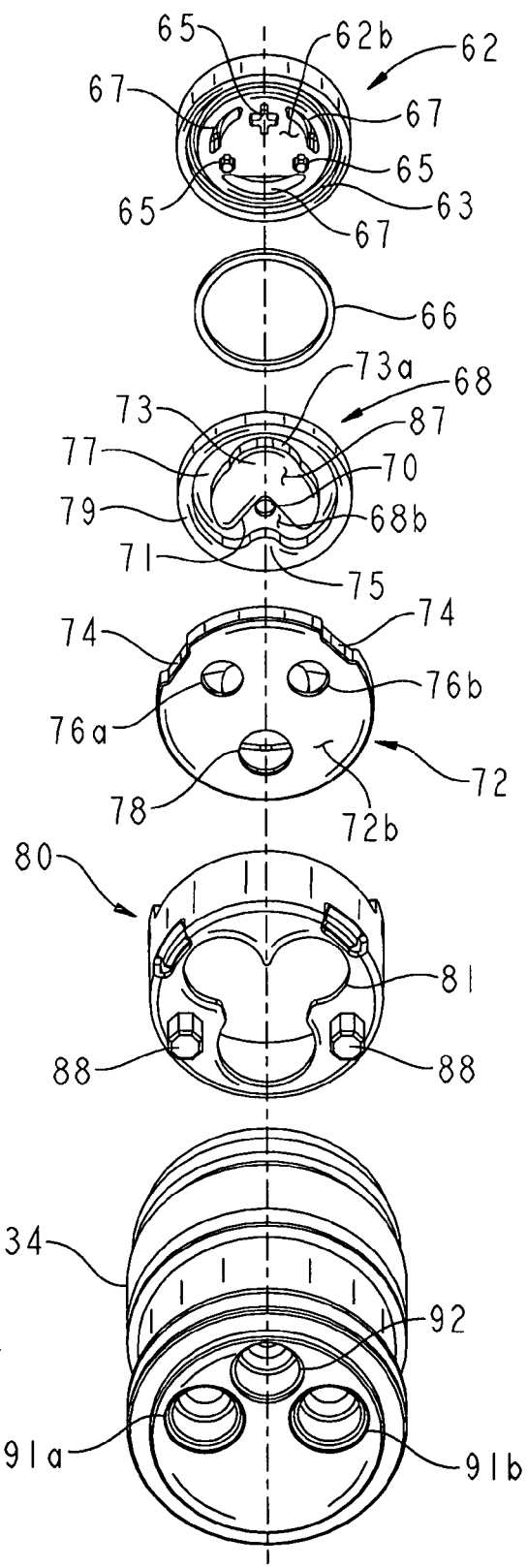
FIG. 5 is an exploded bottom perspective view of internal components of the valve assembly shown in FIG. 4.

Referring now to FIGS. 3-5, longitudinal extension 29 of stem assembly 23 extends into recess or aperture 64 of carrier 62. Carrier 62 includes plurality of projections 65, plurality of arcuate openings 67, and groove 63 configured to accept a conventional O-ring 66. Plurality of projections 65 of carrier 62 interact with depressions 69 in the upper surface 68a of upper disc 68. O-ring 66 contacts the upper surface 68a of upper disc 68 and forms a circumferential seal between carrier 62 and the upper surface 68a of upper disc 68. Upper disc 68 includes an aperture 70 extending therethrough to provide fluid communication between a lower surface 68b of upper disc 68 and the lower surface 62b of carrier 62.

As shown in FIG. 3, upper disc 68 is positioned on top of lower disc 72 in valve assembly 24. The lower surface 68b of upper disc 68 is shown in more detail in FIG. 5. Upper disc 68 is positioned on top of lower disc 72 in valve assembly 24 to control the mixing of hot and cold water and the flowrate of water through valve assembly 24. As further detailed below in connection with FIGS. 10-22, the upper disc 68 is illustratively supported for movement relative to lower disc 72, wherein translational movement in a first direction controls flow rate and translational movement in a second perpendicular direction controls the temperature (i.e., mixing of hot and cold water). Lower disc 72 includes a pair of notches 74 configured to interact with portions 86 of lower housing 80 to orient and prevent rotation of lower disc 72 relative to lower housing 80. In this embodiment, both upper and lower discs 68 and 72 are constructed of a ceramic material, however any suitable material may be used, such as stainless steel.

Referring further to FIGS. 4 and 5, the upper and lower surfaces of carrier 62, upper disc 68, lower disc 72, lower housing 80 and valve body 34 are shown. Lower disc 72 includes hot and cold water inlet ports 76a and 76b and outlet port 78 illustratively extending between upper and lower surfaces 72a and 72b, respectively. Each inlet port 76a and 76b includes an inner edge 83 and an outer control edge 85 positioned laterally, illustratively radially outwardly, from the inner edge 83. The lower surface 68b of the upper disc 68 defines a laterally extending first sealing surface 87 and the upper surface 72a of the lower disc 72 defines a laterally extending second sealing surface 89 sealingly engaging the first sealing surface 87. The lower surface 68b of upper disc 68 includes a circumferentially extending channel 77 defined between a central portion 73, having an inner channel edge 73a, and an annular outer channel edge or lip 79. Central portion 73 includes V-shaped section 71 conforming to a projection 75 of annular lip 79. Channel 77 and central portion 73 provide selective communication between hot and cold water inlet ports 76a and 76b and outlet port 78 when upper disc 68 is moved relative to lower disc 72. The interaction between upper disc 68 and lower disc 72 during operation of valve assembly 24 is described in more detail in connection with FIGS. 10-22. In the illustrative embodiment, carrier 62 and upper disc 68 have substantially smaller diameters than lower disc 72 and lower housing 80 to enable upper disc 68 to be moved relative to lower disc 72, as shown in FIG. 10.

Referring now to FIGS. 3 and 4, lower disc 72 is positioned in lower housing 80. Opening 81 of lower housing 80 is sized to allow seals 90, which are positioned in hot and cold water inlet bores 91a and 91b and outlet bore 95, to seal against the lower surface 72b of lower disc 72. Seals 90a and 90b form a seal around hot and cold water inlet ports 76a and 76b on lower surface 72b of lower disc 72, and seal 90c forms a seal around outlet port 78 on the lower surface 72b of lower disc 72. Collectively, seals 90 form a single sealing surface between valve body 34 and internal components of valve assembly 24. Hot and cold inlet bores 91a and 91b are illustratively connected to hot and cold water supply conduits 20 and 22, respectively. Outlet bore 95 may be connected to an outlet supply line to, for example, spout 16 of faucet 10, such as the one shown in FIG. 1. Hot and cold water inlet ports 76a and 76b and outlet port 78 of lower disc 72 are positioned directly above, and in fluid communication with, hot and cold water inlet bores 91a and 91b and outlet bore 95 of valve body 34, respectively.

Referring now to FIGS. 3-5, lower housing 80 includes a pair of upwardly extending extensions 82 including apertures 84 configured to accept projections 52 of coupling member 50 to secure coupling member 50 to lower housing 80. Lower housing 80 also includes a pair of lower projections 88 configured to be positioned in bores 93 in the lower interior surface of valve body 34 to prevent rotation of lower housing 80 relative to valve body 34. As illustrated, seals 90a, 90b, and 90c are positioned in bores 91a, 91b, and 95 in the lower interior surface of valve assembly 90 to prevent water leakage between bores 91a, 91b, and 95 in valve body 34 and the lower surface 72b of lower disc 72. In this illustrative embodiment, valves 90 are constructed of rubber and provide a biasing force between the lower surface of valve body 34 and lower disc 72. Seals 90 may be of the type detailed on U.S. patent application Ser. No. 11/444,228, filed May 31, 2006, which has been expressly incorporated by reference herein. Valve body 34 includes a pair of notches 35 configured to accept tabs 44 extending from upper housing 38 to prevent rotation of upper housing 38 relative to valve body 34. Valve body 34 also includes external threads 37 configured to interact with internal threads 39 (FIG. 10) on the interior surface of bonnet nut 28 to secure bonnet nut 28 to valve body 34.

Referring further to FIG. 5, when valve assembly 24 is coupled to hot and cold water supply conduits 20 and 22, a pressure reducing hydrobalance is created between carrier 62 and upper disc 68. Aperture 70 in upper disc 68 allows water from channel 77 to flow between carrier 62 and the upper surface 68a of upper disc 68. Openings 67 of carrier 62 may also be supplied with water supplied from aperture 70. In the illustrative embodiment, the area of upper surface 68a of upper disc 68 defined within O-ring 66, which is positioned in groove 63 of carrier 62, is greater than the collective cross-sectional area of seals 90a and 90b, which are positioned between the lower surface of lower disc 72 and valve body 34. In other words, the water pressure between carrier 62 and upper disc 68 has a greater surface area on which to act than that of water pressure acting on seals 90a and 90b. Therefore, the water pressure creates a net downward force on the upper surface 68a of upper disc 68 to minimize any leakage between upper disc 68 and lower disc 72.

Referring now to FIG. 10, a cross-sectional view of valve assembly 24 is shown. As discussed above, interior ridge 31 of bonnet nut 28 contacts shoulder portion 48 of 48 of upper housing 38 to provide a compressive force on upper housing 38. Additionally, flange 40 is positioned between bonnet nut 28 and valve body 34 to prevent corrosion and provide a biasing force between bonnet nut 28 and valve body 34. Tabs 42 of upper housing 38 interact with notches 41 of aperture 60 in coupling member 50 to couple coupling member 50 to upper housing 38. Longitudinal extension 29 extends through opening 53 in coupling number 50 into aperture 64 in carrier 62. Projections 65 extend into depressions 69 in the upper surface of upper disc 68. As discussed above, the diameters of carrier 62 and upper disc 68 are substantially smaller than the diameter of lower disc 72.

As further shown in FIG. 10, carrier 62 and upper disc 68 are translationally moved by longitudinal extension 29 of stem assembly 23 in different directions (e.g., orthogonal) to selectively adjust the temperature and the flowrate of water supplied by valve assembly 24. As discussed above, one of the seals 90c is positioned in outlet bore 95 of valve body 34. Outlet bore 95 opens into radially extending outlet bore 36 in valve body 34. As detailed herein, seal 90c directly contacts the lower surface of lower disc 72 around outlet port 78. Outlet bore 36 is also in communication with axially extending outlet bore 92 of valve body 34. Bore 92 may be coupled to spout 16 or to an accessory supply line which may be used for a hand sprayer or any other suitable fluid delivery device.

Figure 11:
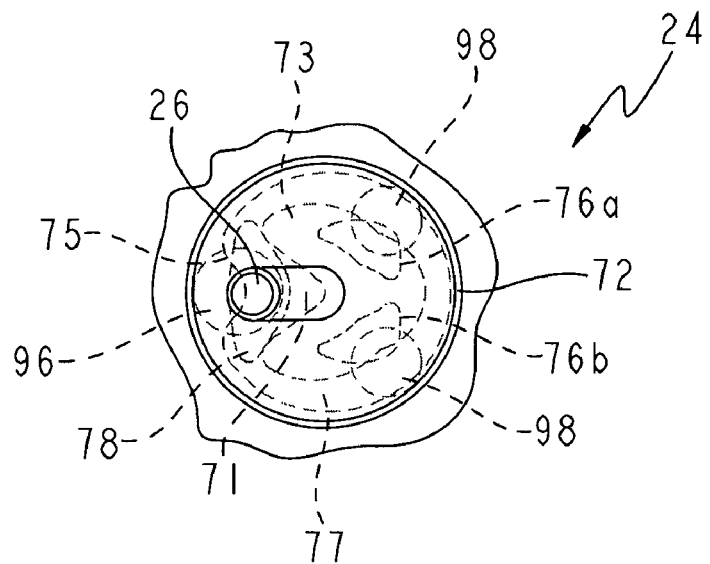
FIG. 11 is a partial top plan view of the valve assembly shown in FIG. 10, with internal components of the valve assembly shown in phantom.
Figure 12:
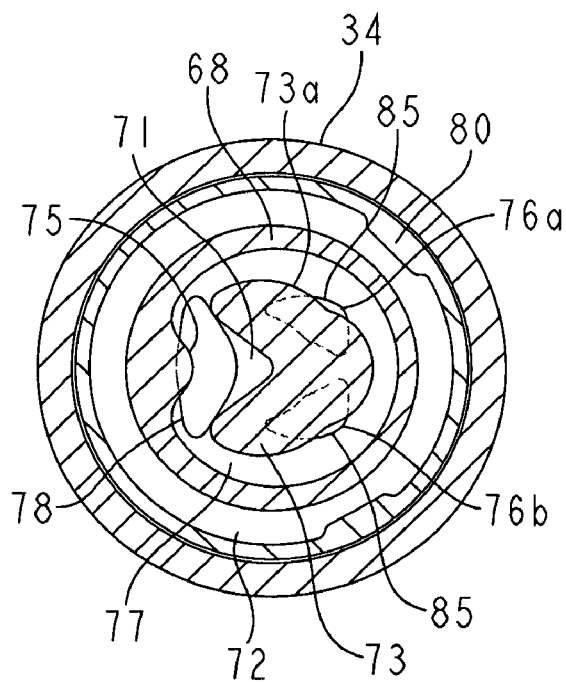
FIG. 12 is a cross-sectional view of the upper and lower discs of the valve assembly taken along lines 12-12 of FIG. 10, with the valve assembly being oriented in the partially open orientation.

Referring now to FIGS. 10-12, valve assembly 24 is shown with stem 26 pivoted or oriented to place the internal components of valve assembly 24 in the partially open position. When stem 26 is in this orientation, an equal amount of hot and cold water is allowed to pass through hot and cold water inlets 76a and 76b to outlet port 78. Referring specifically to FIGS. 11 and 12, in this orientation, channel 77 and the lower surface 68b of upper disc 68 are positioned over a small portion of each of the hot and cold water inlet ports 76a and 76b. In other words, the inner channel edge 73a partially overlaps the outer control edges 85 of the inlet ports 76a and 76b. Central portion 73 of upper disc 68 is covering a significant portion of inlet ports 76a and 76b. As water enters channel 77 through inlet hot and cold water inlet ports 76a and 76b, it fills channel 77, mixes to create "warm" water, and exits through outlet 78, which is substantially open to channel 77. The "warm" water then moves through outlet port 78 and seal 90 to outlet bore 95 and spout 16 as shown in FIG. 1.

Figure 13:
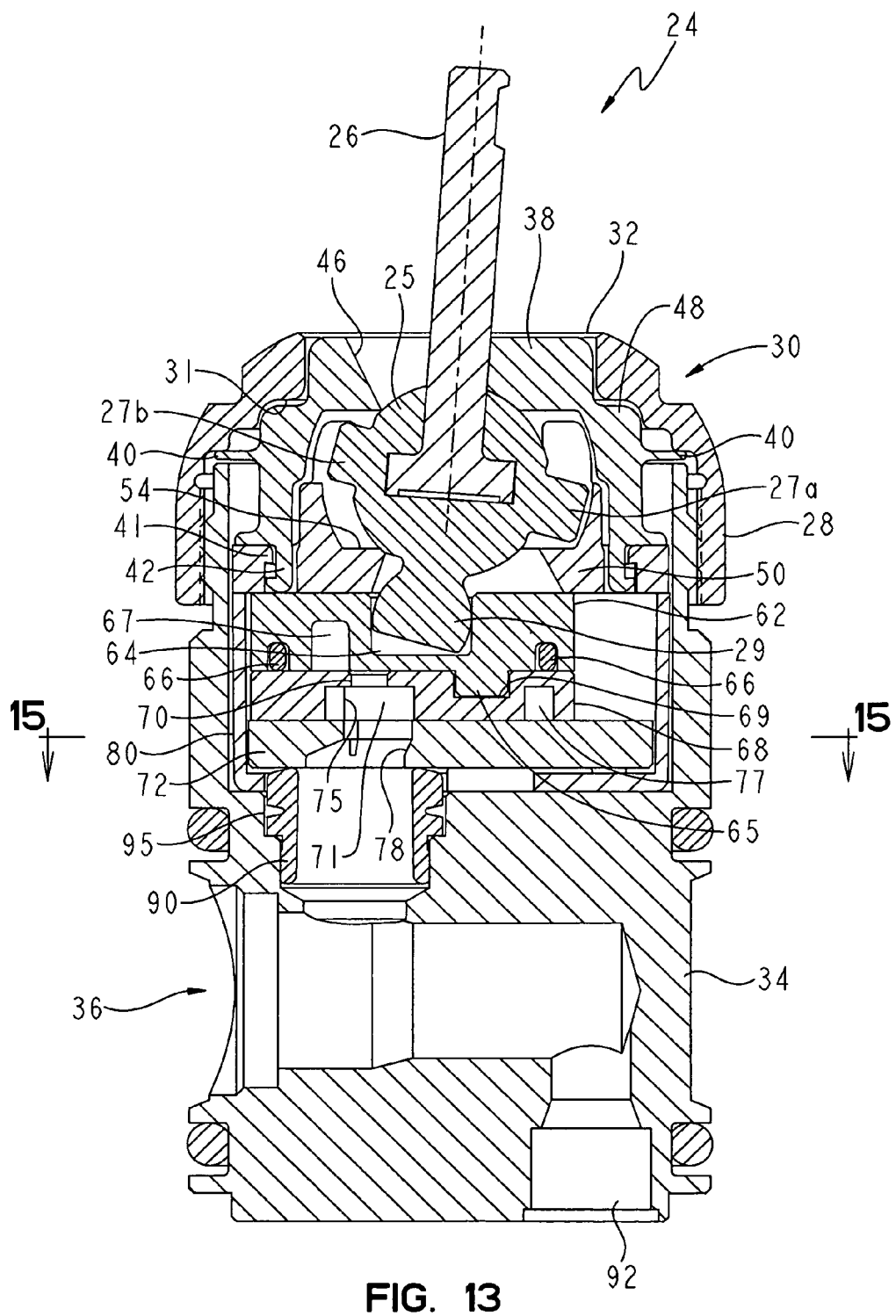
FIG. 13 is a cross-sectional view of the valve assembly similar to FIG. 10, with the valve assembly shown in the fully-opened orientation.
Figure 14:
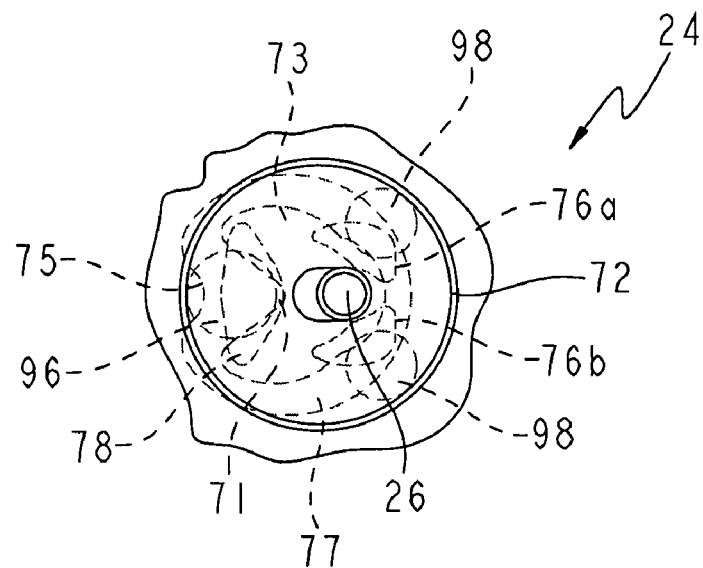
FIG. 14 is a partial top plan view of the valve assembly shown in FIG. 13, with internal components shown in phantom.
Figure 15:
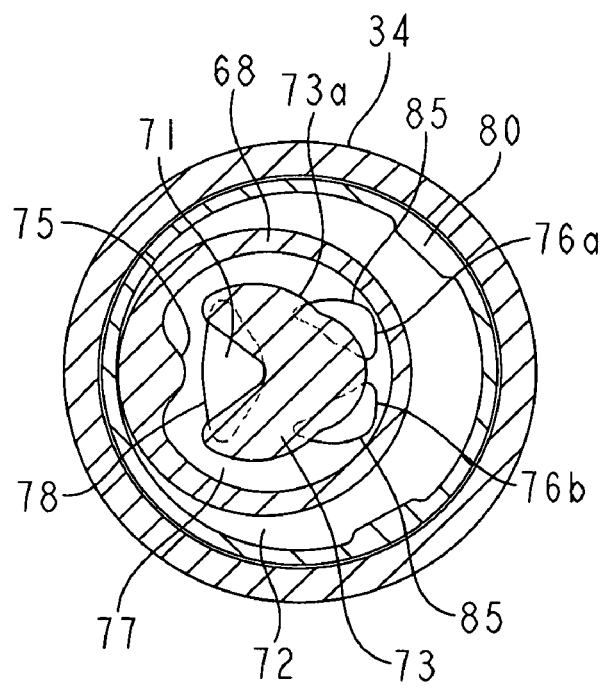
FIG. 15 is a cross-sectional view of the upper and lower discs of the valve assembly taken along lines 15-15 of FIG. 13, with the valve assembly being oriented in the fully-open orientation.

Referring now to FIGS. 13-15, stem 26 has been pivoted forward to a different orientation such that inlet ports 76a and 76b are substantially uncovered or unblocked by central portion 73 of upper disc 68. In other words, there is a substantial overlap between the inner channel edge 73a and the outer control edges 85 of the inlet ports 76a and 76b. A greater amount of hot and cold water is allowed to fill channel 77, mix to create "warm" water, and exit through outlet port 78. The water then exits valve assembly 24 through outlet bore 95 as discussed above. In each of these two positions, hot water and cold water from inlet ports 76a and 76b are mixed in channel 77 to produced warm water, which will exit channel 77 through outlet port 78. In the embodiment shown in FIGS. 10-12, a lower flowrate or amount of water will exit valve assembly 24. In FIGS. 13-15, a "full flow," or maximum flowrate of water, will exit valve assembly 24.

Figure 16:
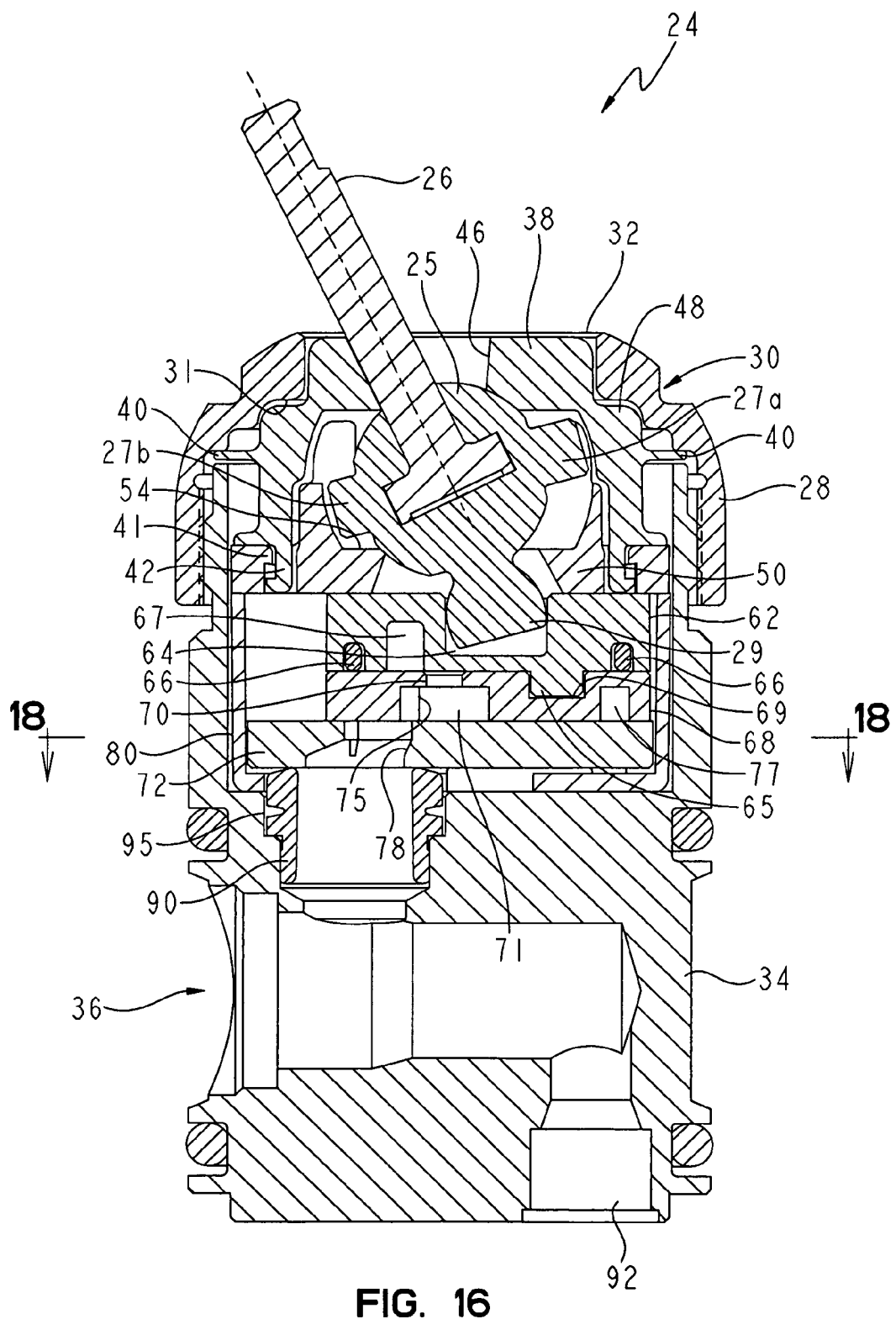
FIG. 16 is a cross-sectional view of the valve assembly similar to FIG. 10, with the valve assembly shown in the fully-closed orientation.
Figure 17:
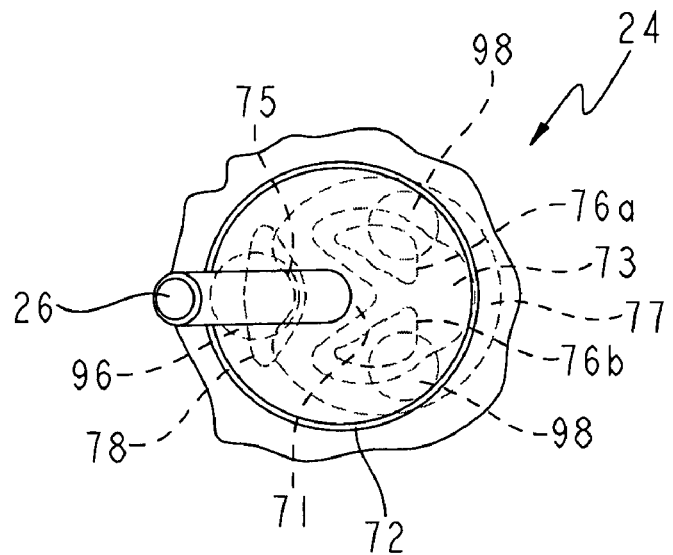
FIG. 17 is a partial top plan view of the valve assembly shown in FIG. 16, with internal components shown in phantom.
Figure 18:
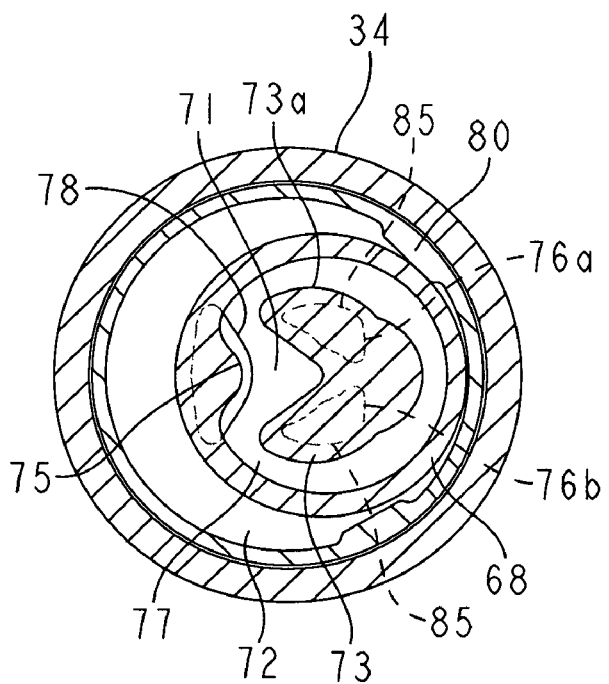
FIG. 18 is a cross-sectional view of the upper and lower discs of the valve assembly taken along lines 18-18 of FIG. 16, with the valve assembly being oriented in the fully-closed orientation.

Referring now to FIGS. 16-18, stem 26 is shown pivoted in a rearward direction to the fully or completely closed orientation. In this orientation, valve assembly 24 will be closed (i.e., no water will flow through valve assembly 24). Scallop or convergence 46a of aperture 46 (FIG. 2) cooperates with longitudinal extension 29 of stem assembly 23 to provide a detent of stem assembly 23 when in the completely closed or zero position. As shown in FIGS. 16 and 18, central portion 73 of upper disc 68 completely covers or blocks hot and cold water inlet ports 76a and 76b to prevent water from filling channel 77 and exiting through outlet port 78. Even if water were to leak through either inlet ports 76a and 76b to channel 77, the water would exit channel 77 through outlet 78 to create a drip or small stream, for example, through the spout of the faucet assembly including valve assembly 24. In this manner, channel 77 prevents water leaks in the valve assembly 24 from leaking through the valve assembly to the faucet base 12 or under the faucet 10, which may cause corrosion around the faucet base 12 or handle 14 of the faucet 10. If any leakage were to occur in valve assembly 24 as a result of damage to discs 68 and 72 adjacent ports 76a, 76b, 78, the water leaked would exit valve assembly 24 through outlet bore 95 and any attached spout 16 or accessory rather than around the base 12 of the faucet 10.

Figure 19:
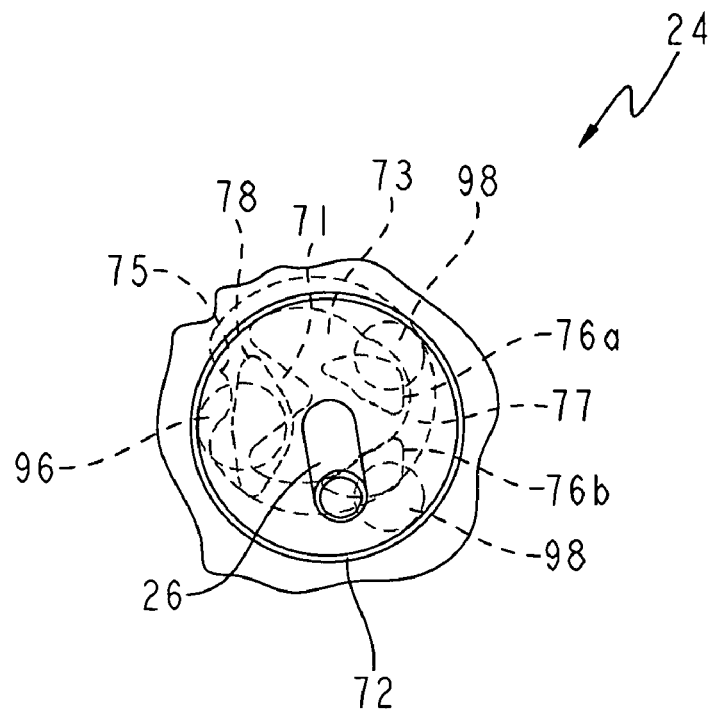
FIG. 19 is a partial top plan view of the valve assembly shown in the previous figures with internal components being shown in phantom, the valve assembly being oriented to allow only cold water flow.
Figure 20:
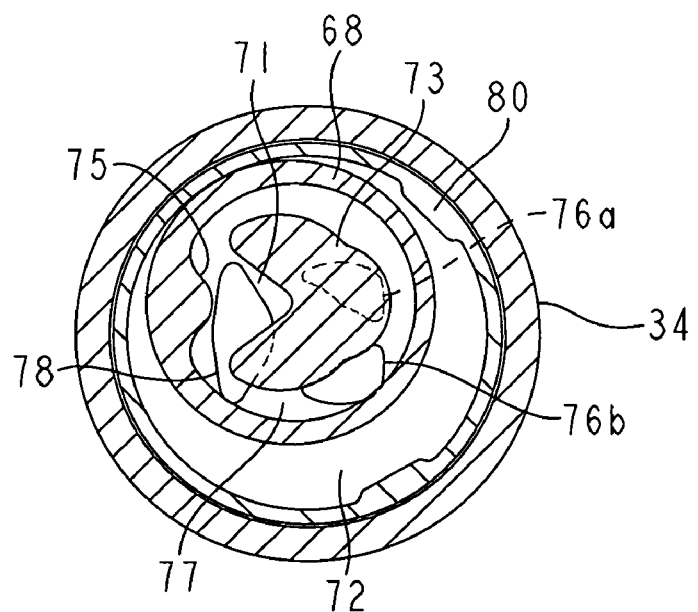
FIG. 20 is a cross-sectional view of the upper and lower discs of the valve assembly shown in FIG. 19, with the valve assembly being oriented to allow only cold water flow.
Figure 21:
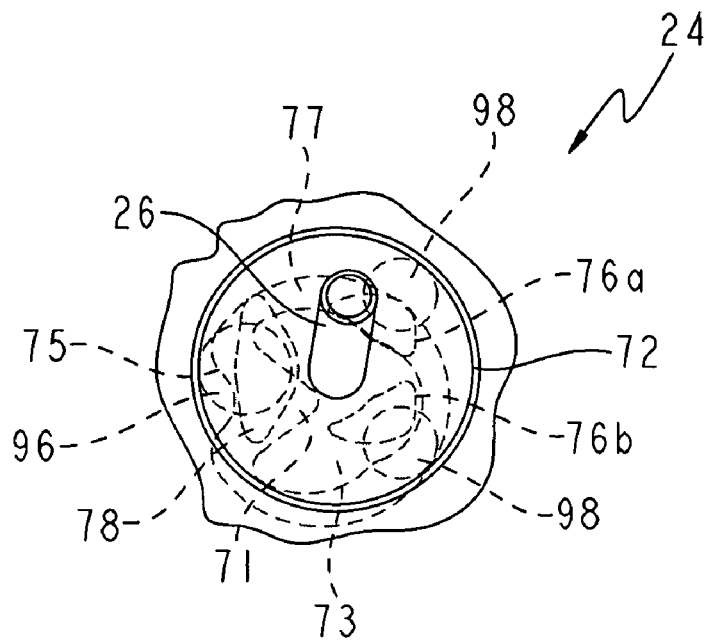
FIG. 21 is a partial top plan view of the valve assembly shown in the previous figures with internal components being shown in phantom, the valve assembly is oriented to allow only hot water flow.
Figure 22:
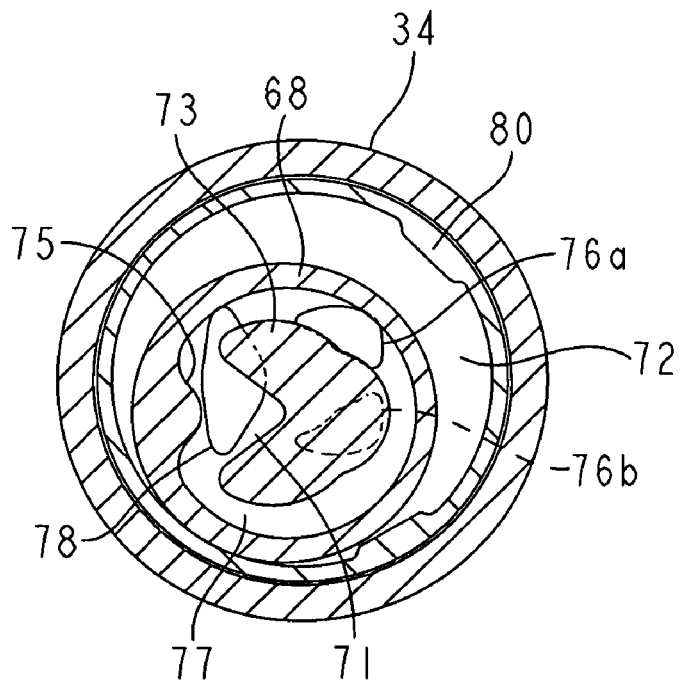
FIG. 22 is a cross-sectional view of the upper and lower discs of the valve assembly shown in FIG. 21 with the valve assembly being oriented to allow only hot water flow.

FIGS. 19 and 20 illustrate the stem 26 orientation and the corresponding position of upper disc 68 when the operator desires only cold water from valve assembly 24. As shown, when stem 26 is positioned in this orientation, central portion 73 of upper disc 68 completely covers or blocks hot water inlet port 76a and completely uncovers or unblocks the cold water inlet port 76b, allowing the water from the uncovered port 76b to flow through channel 77 to outlet port 78. Conversely, in FIGS. 22 and 23, the stem 26 orientation shown opens the opposite port 76a (i.e., allows the user to select completely hot water flow). As shown, in this orientation, central portion 73 of upper disc 68 completely covers or blocks the previously uncovered cold water inlet port 76b and completely opens the previously covered hot water inlet port 76a to allow hot water to fill channel 77 and exit through outlet port 78. In other words, movement of the upper disc 68 relative to the lower disc 72 in a direction from the hot water inlet port 76a to the cold water inlet port 76b causes an increase in water flow through the hot water inlet port 76a. while movement of the upper disc 68 relative to the lower disc 72 in a direction from the cold water inlet port 76b to the hot water inlet port 76a causes an increase in water flow through the cold water inlet port 76b.

Figure 23:
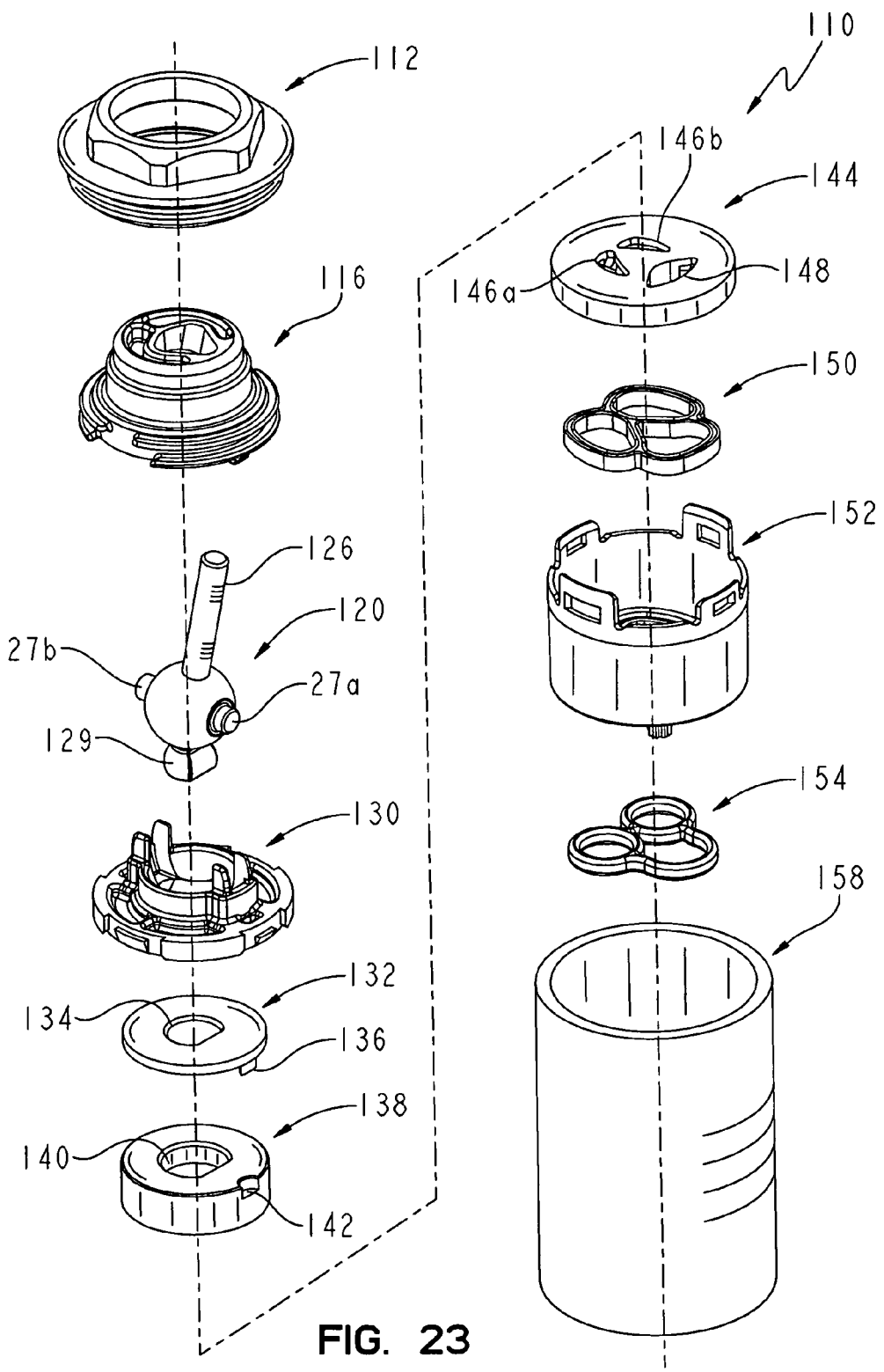
FIG. 23 is an exploded perspective view of another illustrative embodiment valve assembly.
Figure 24:
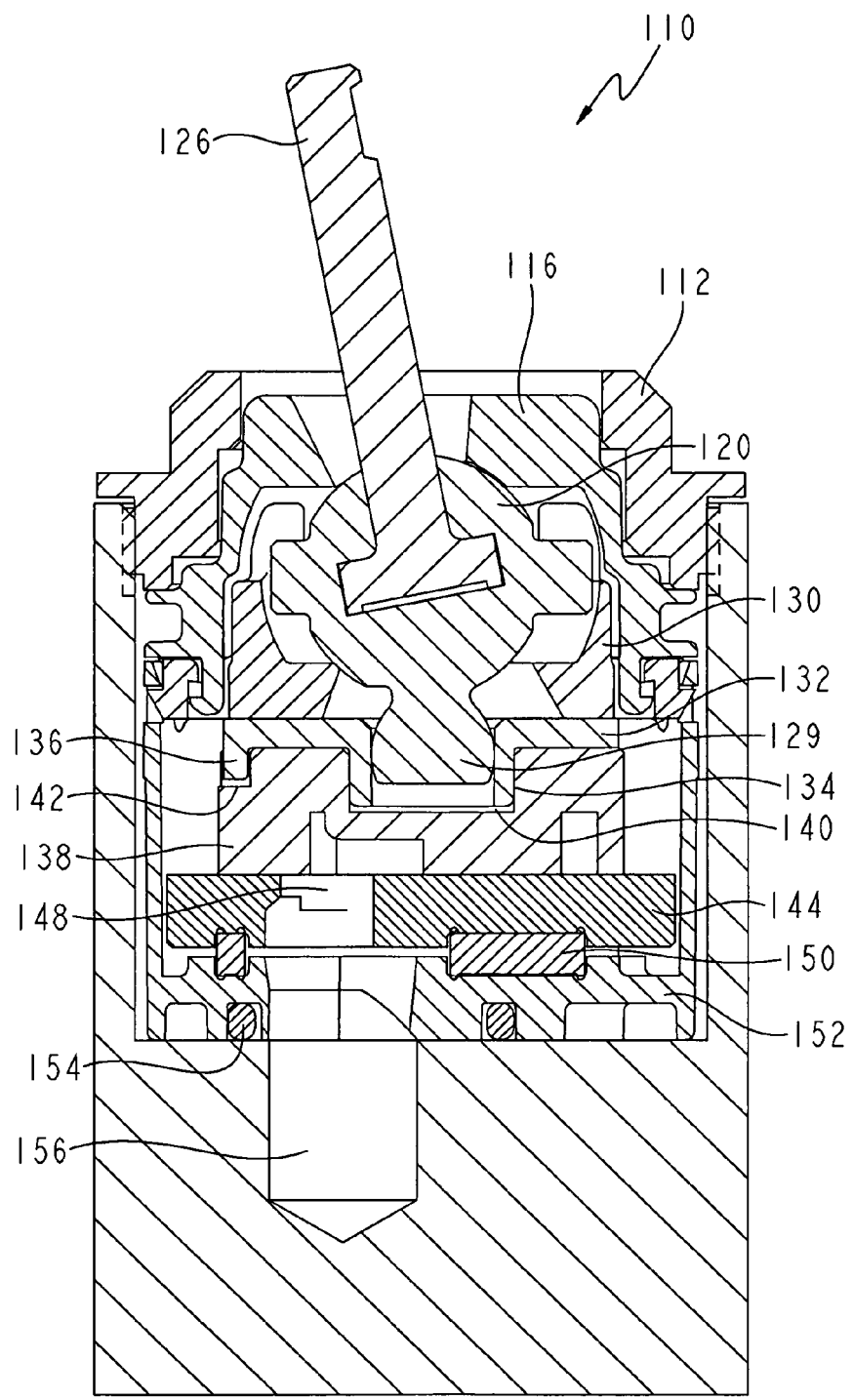
FIG. 24 is a cross-sectional view of the valve assembly shown in FIG. 23.

Another illustrative embodiment of valve assembly 24 is shown in FIGS. 23-26. Referring now to FIGS. 23 and 24, valve assembly 110 includes bonnet nut 112, upper housing 116, stem assembly 120, coupling member 130, carrier 132, upper disc 138, lower disc 144, upper seal 150, lower housing 152, lower seal 154, and valve body 158. Valve assembly 110 is similar to valve assembly 24 shown in the previous embodiment, however valve assembly 110 includes two opposing sealing surfaces instead of the single sealing surface defined by seals 90 in valve assembly 24. In this embodiment, carrier 132 includes interior wall 134 and downward extending projection 136, which interacts with notch 142 in upper disc 138. Upper disc 138 also includes opening 140 which is configured to accept interior wall 134 of carrier 132. Longitudinal extension 129 of stem assembly 120 extends through coupling member 130 and into interior wall 134 of carrier 132 to actuate carrier 132 and upper disc 138.

Figure 25:
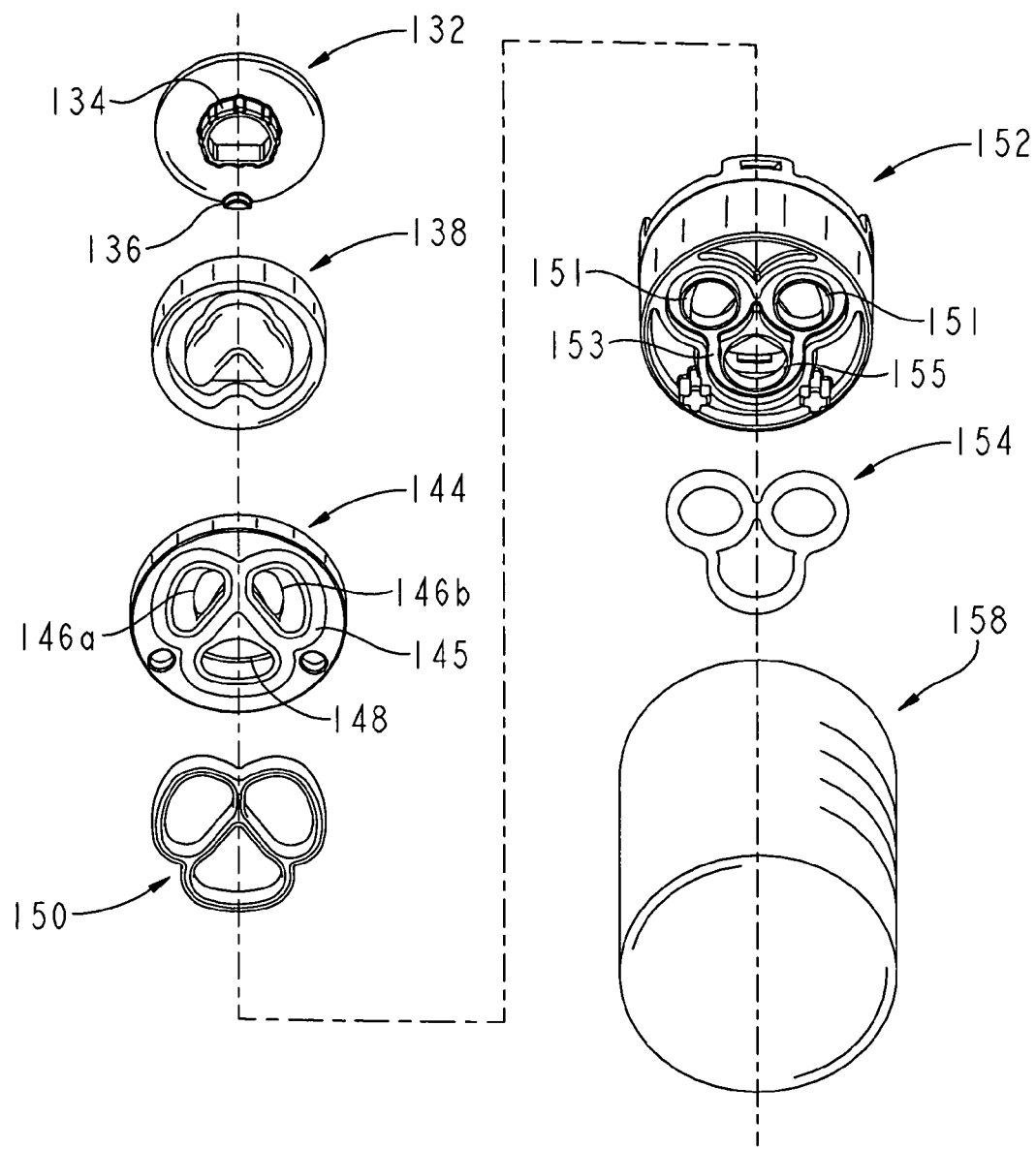
FIG. 25 is an exploded bottom perspective view of the internal components of the valve assembly shown in FIGS. 23 and 24.
Figure 26:
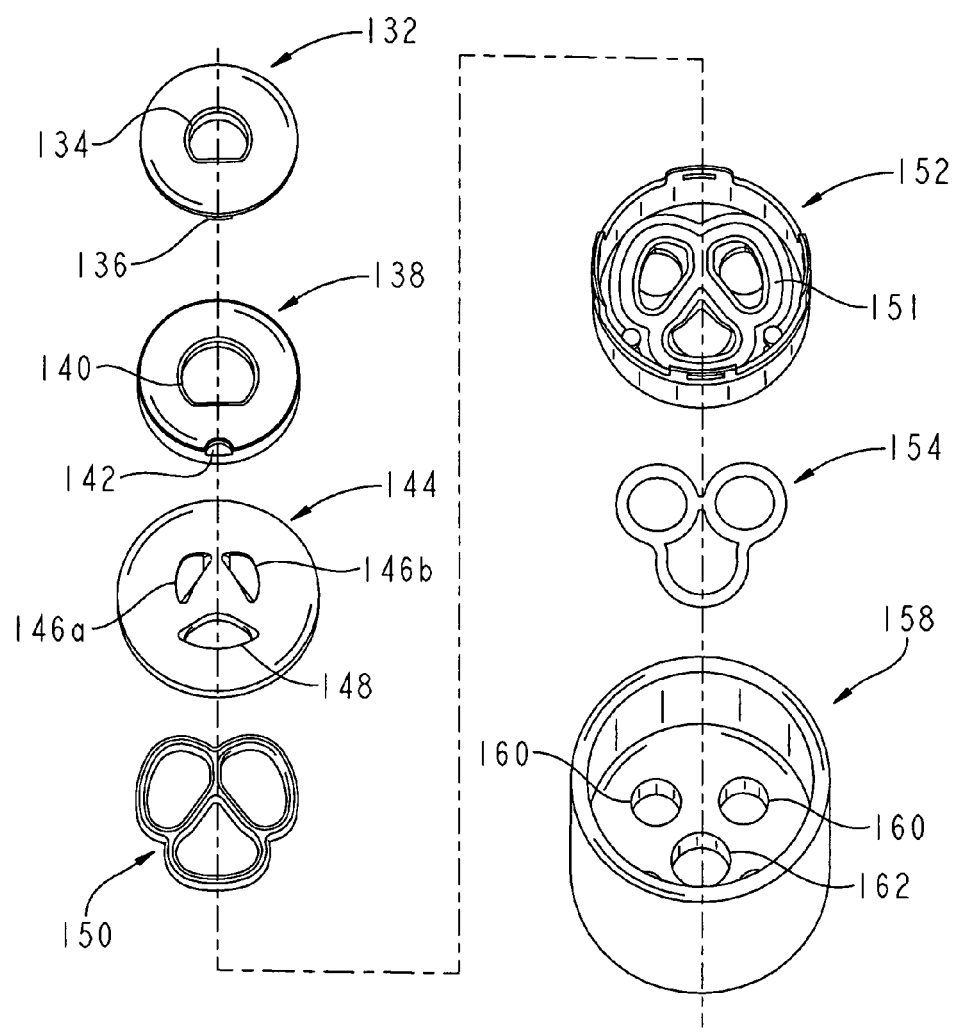
FIG. 26 is an exploded upper assembly view of the internal components of the valve assembly shown in FIGS. 23-25.
Figure 27:
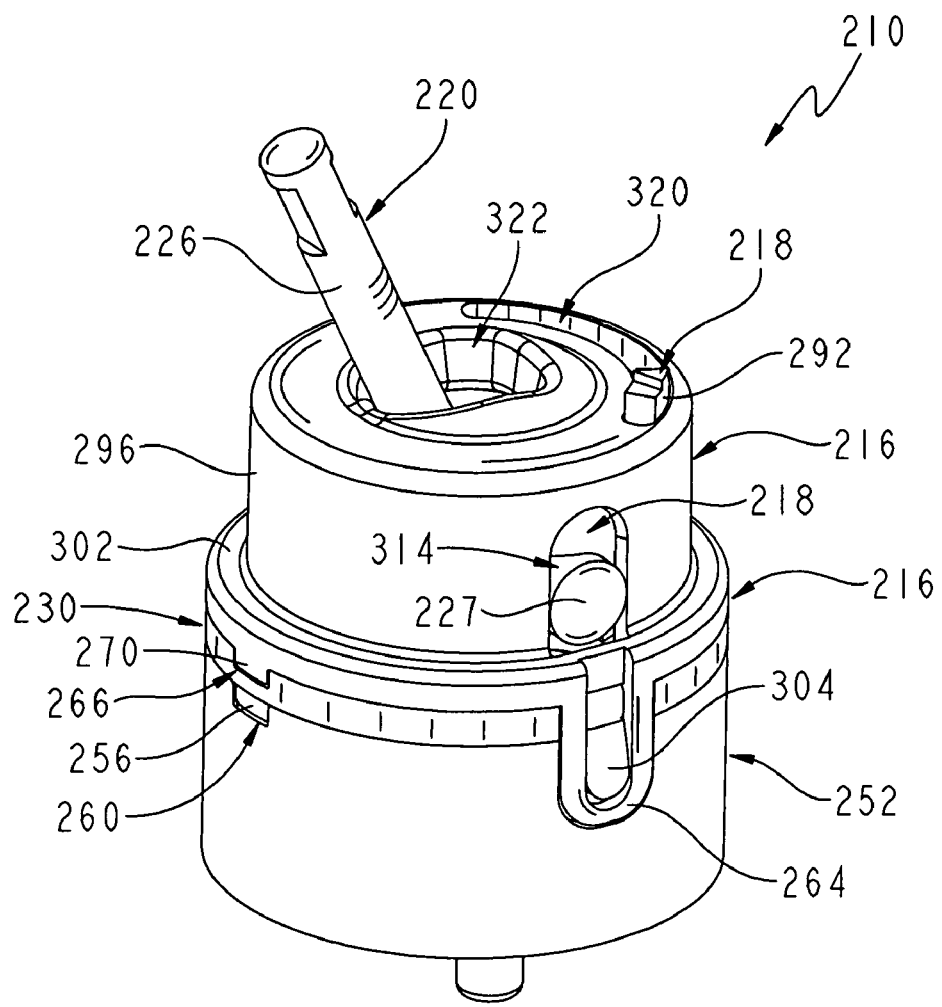
FIG. 27 is a partial perspective view of a further illustrative embodiment valve assembly, with the valve body and the bonnet nut removed for clarity.

Referring now to FIGS. 25 and 26, lower disc 144 includes hot and cold water inlet ports 146a and 146b and outlet port 148. The lower surface of lower disc 144 includes channel 145 extending around inlet ports 146a and 146b and outlet port 148. Seal 150 is positioned in channel 145 and corresponds to channel 151 in the upper surface of lower housing 152 as shown in FIG. 26. The lower housing 152 includes channel 153 extending around inlet apertures 151 and outlet aperture 155. Channel 153 corresponds to seal 154 which is positioned in channel 153 to provide a seal against the interior lower surface of valve body 158. Valve body 158 includes inlet bores 160 and outlet bore 162 which are configured to couple to hot and cold water inlet supply lines and an outlet supply line. In this embodiment, valve assembly 110 includes two sealing surfaces 150 and 154 compared to the single layer of sealing surfaces formed by seals 90 between lower disc 72 and the interior lower surface of valve body 34 of valve assembly 24 shown in FIGS. 2-22.

A further illustrative embodiment valve assembly 210 is shown in FIGS. 27-38D. While not shown, bonnet nut 28 and valve body 34 similar to those detailed above may be utilized to receive the internal valve components of valve assembly 210. Valve assembly 210 includes upper housing 216, temperature limiting member 218, stem assembly 220, coupling member 230, carrier 232, upper disc 238, lower disc 244, upper seal 250, lower housing 252, and lower seal 254. Carrier 232, upper disc 238, and lower disc 244, may be similar to carrier 132, upper disc 138, and lower disc 144, as detailed above. Likewise, seals 250 and 254 may be similar to seals 150 and 154, as detailed above in connection with valve assembly 110.

Furthermore, as with valve assembly 110, upper disc 238 may include opening 140 which is configured to receive interior wall 134 of carrier 232. Also, lower disc 244 includes hot and cold water inlet ports 146a and 146b and outlet port 148.

Figure 28:
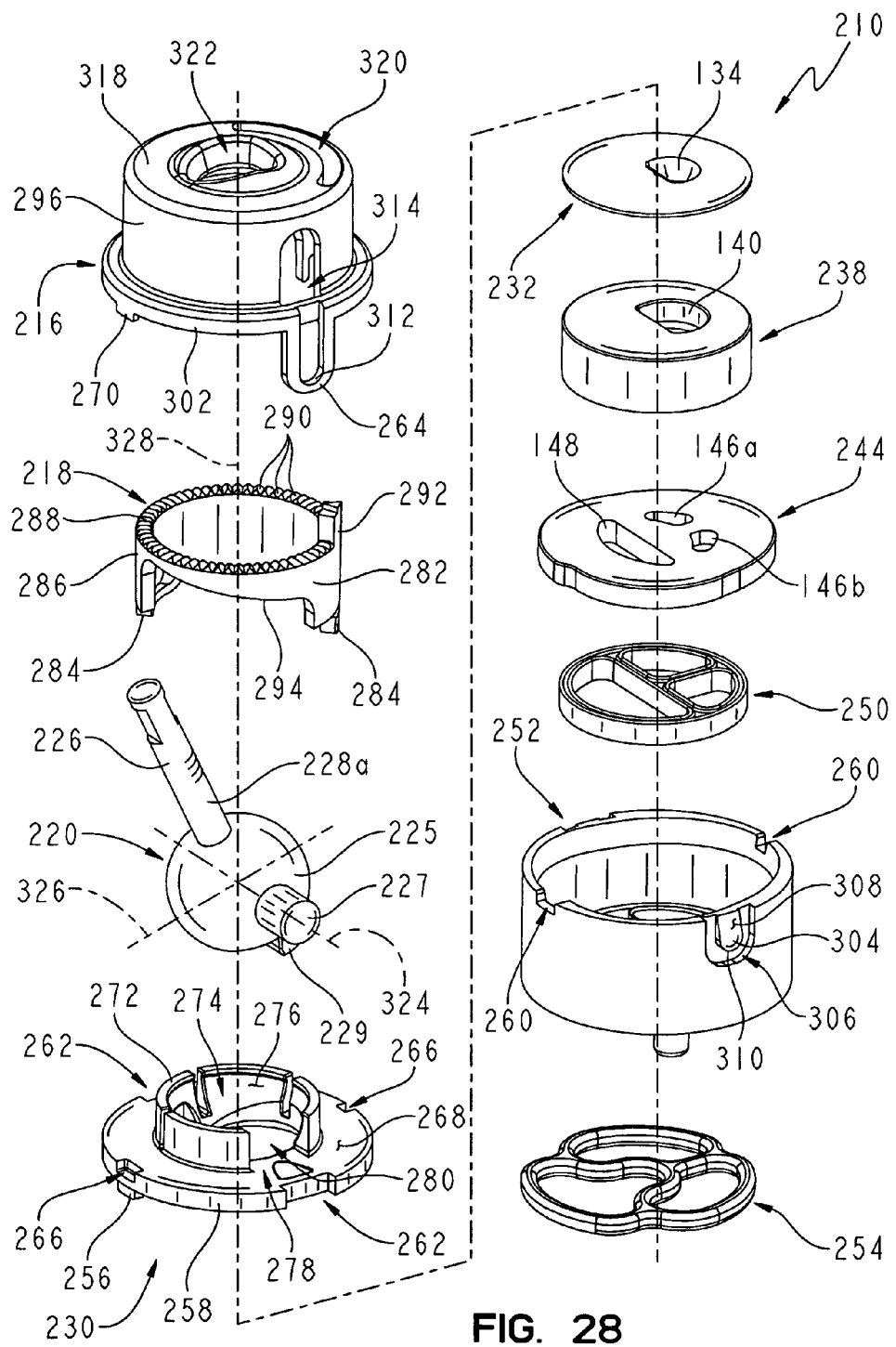
FIG. 28 is an exploded perspective view of the valve assembly of FIG. 27.
Figure 31:
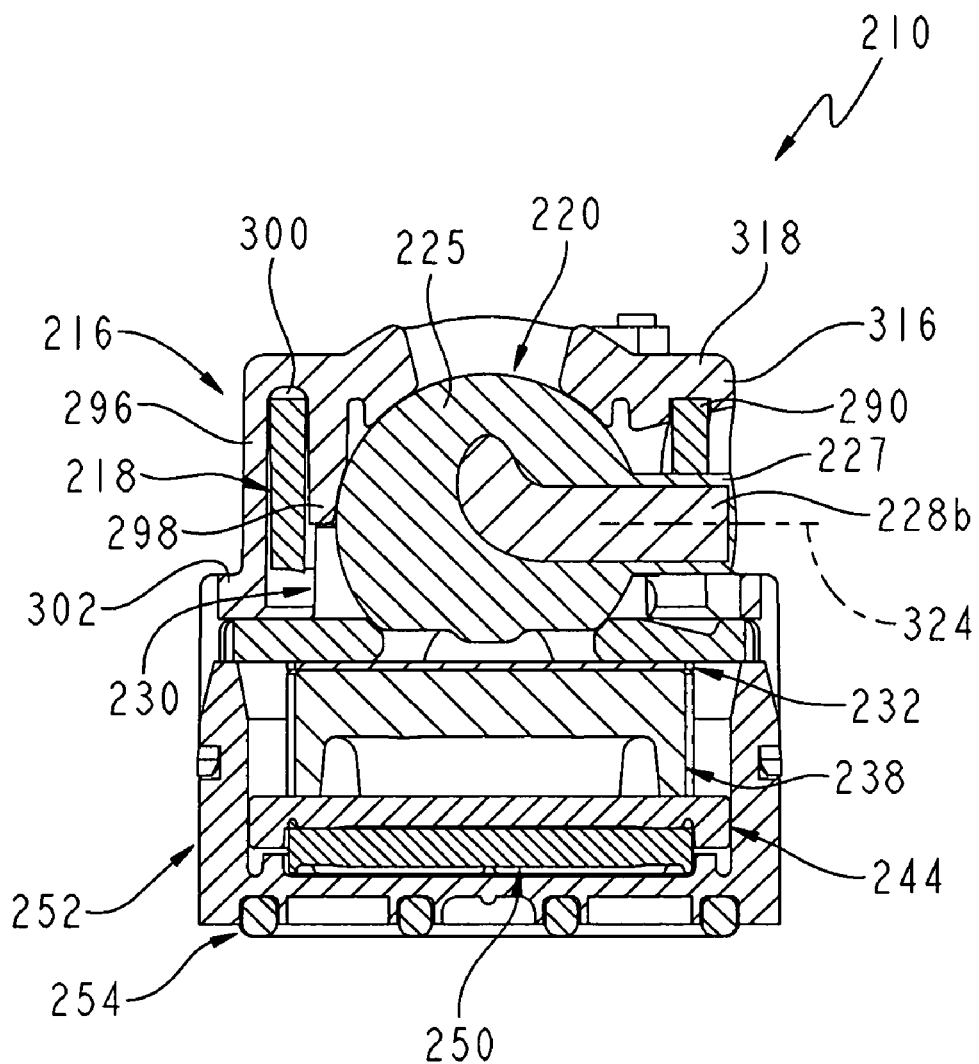
FIG. 31 is a cross-sectional view taken along line 31-31 of FIG. 29.

As shown in FIG. 28, stem assembly 220 includes a ball 225 which receives a stem 226. As shown in FIGS. 28 and 31, stem 226 may be substantially L-shaped and include upwardly extending leg 228a and laterally extending leg 228b. Ball 225 may be molded from a thermoplastic material over a portion of stem 226, such that leg 228b defines a support for a lateral extension 227. A longitudinal extension or knuckle 229 extends downwardly from the ball 225 generally opposite leg 228a of the stem 226. In a manner similar to that detailed above, ball 225 transmits motion of stem 226 to upper disc 238 through extension 229 and carrier 232.

Figure 32:
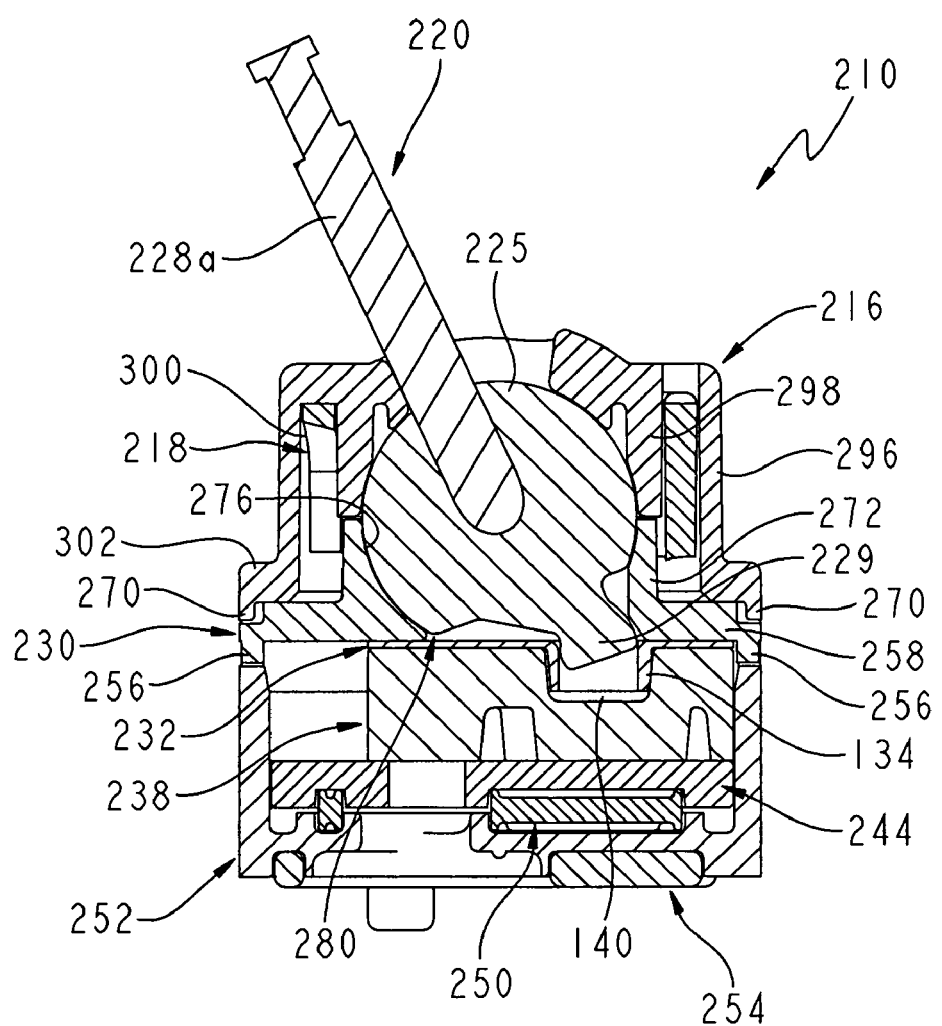
FIG. 32 is a cross-sectional view taken along line 32-32 of FIG. 29.

With reference to FIGS. 28 and 32, coupling member 230 includes diametrically opposed tabs 256 extending downwardly from a circular base 258. Tabs 256 are configured to be received within notches 260 formed within lower housing 252 to facilitate proper angular orientation between coupling member 230 and lower housing 252 and prevent relative rotation therebetween. A pair of diametrically opposed notches 262 are formed within an outer edge of base 258 and are configured to receive locking extensions or loops 264 of upper housing 216. A pair of diametrically opposed recesses 266 extend downwardly from an upper surface 268 of base 258 and are configured to receive tabs 270 of upper housing 216, thereby facilitating proper angular orientation between upper housing 216 and coupling member 230. An upwardly extending cylindrical wall 272 is coupled to base 258 and forms a cavity 274 having an arcuate surface 276. An opening 278 formed within wall 272 is configured to receive extension 227 of stem assembly 220. Ball 225 of stem assembly 220 is configured to contact arcuate surface 276 of coupling member 230 in a manner similar to that detailed above with respect to valve assembly 24. Aperture 280 is positioned at the bottom of cavity 224 and is configured to receive extension 229 of stem assembly 220 which, in turn, engages carrier 232.

Figure 34:
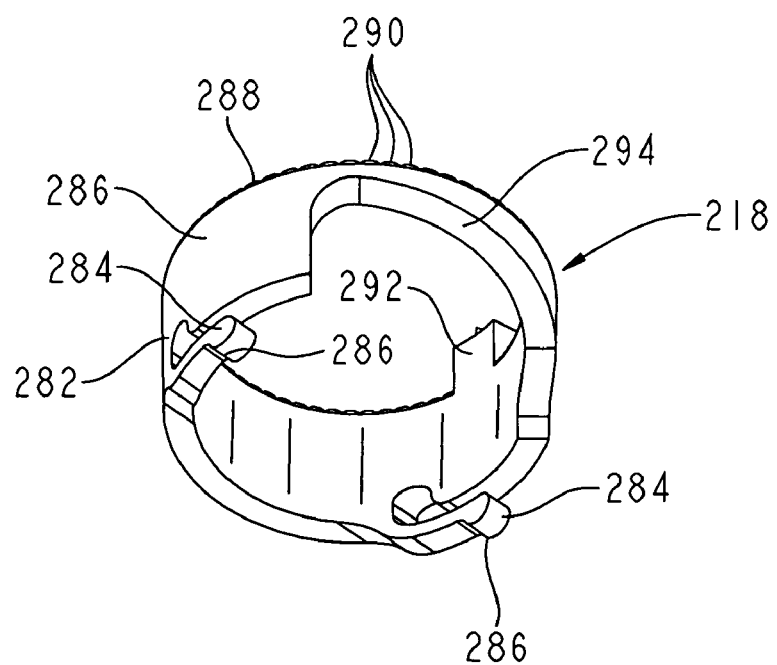
FIG. 34 is a bottom perspective view of the temperature limiting member of the valve assembly of FIG. 27.
Figure 35:
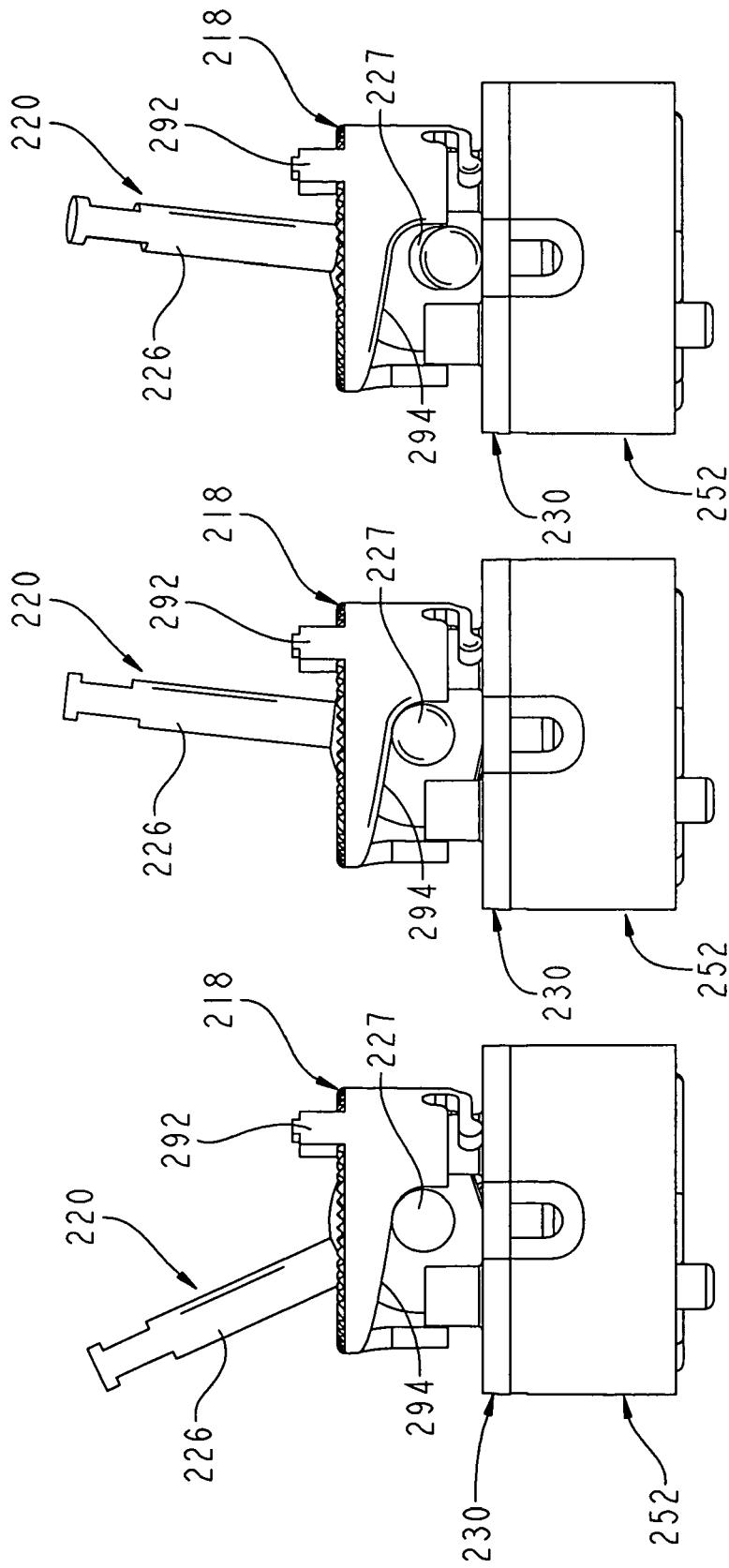
FIG. 35A is a side elevational view of the valve assembly of FIG. 29, with the temperature limiting member shown in a low limit position and the stem shown in a fully-closed position.
FIG. 35B is a side elevational view similar to FIG. 35A, with the stem shown in an open hot limit position.
FIG. 35C is a side elevational view similar to FIG. 35A, with the stem shown in an open cold limit position.

With reference to FIGS. 28 and 34, temperature limiting member 218 is received intermediate coupling member 230 and upper housing 216. Temperature limiting member 218 includes a cylindrical body portion 282 and a pair of downwardly extending biasing members, illustratively flexible arms 284. The flexible arms 284 have a lower contact surface 286 configured to slide along a glide surface defined by the upper surface 268 of base 258 of coupling member 230. Body portion 282 includes a cylindrical wall 286 having an upper surface 288 supporting a plurality of indexing members, illustratively teeth 290. An indicator 292 extends upwardly above the teeth 290. Wall 286 of cylindrical body portion 282 includes a downwardly facing inclined surface 294. As explained herein, inclined surface 294 cooperates with lateral extension 227 of stem assembly 220 to limit the lateral pivoting motion of stem 226 and extension 229 (i.e., relative to inlet ports 146a and 146b), and hence the maximum allowable temperature of water flowing through the valve assembly 210.

Referring now to FIGS. 28, 29, 31, and 33, upper housing 216 includes a cylindrical outer wall 296 and a cylindrical inner wall 298. Walls 296 and 298 are concentric, thereby defining a channel 300 therebetween. An upper portion of wall 286 of temperature limiting member 218 is supported for movement within channel 300. A rim 302 extends radially outwardly from outer wall 296. Downwardly extending loops 264 are supported by rim 302 and are configured to cooperate with notches 262 formed in the coupling member 230, and with latches or tabs 304 formed within lower housing 252 (FIG. 28). More particularly, the loops 264 are received within recesses 306 surrounding the latches 304. Each latch 304 includes an inclined or ramp surface 308 and a retaining surface 310 configured to cooperate with an inner surface 312 of the respective loop 264. Outer wall 296 includes a receiving channel or slot 314 configured to receive the lateral extension 227 of the stem assembly 220.

Figure 33:
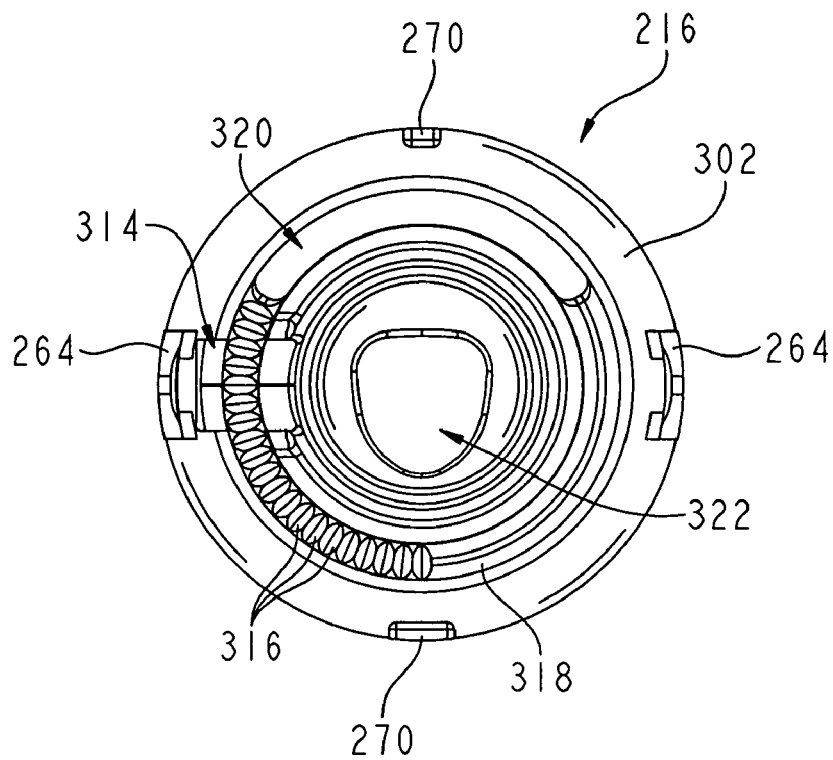
FIG. 33 is a bottom plan view of the upper housing of the valve assembly of FIG. 27.

As shown in FIGS. 31 and 33, a plurality of indexing members, illustratively teeth 316, extend downwardly from an upper member 318 of upper housing 216 and are configured to cooperate with teeth 290 of temperature limit device 218. An arcuate slot 320 is formed within upper member 318 of upper housing 216 and is configured to receive indicator 292. An opening 322 similar to opening 46 of previously described upper housing member 38 is formed within upper member 318.

Pivoting movement of stem assembly 220 about axis 324 of lateral extension 227 controls the flow rate of water, while pivoting movement of stem assembly 220 about an axis 326, perpendicular to axis 324 of lateral extension 227 and stem 226, controls the temperature of water supplied by valve assembly 210. The inclined surface 294 of the temperature limiting member 218 controls the amount of pivoting movement of the stem assembly 220 about axis 326. As further detailed below, rotation of the temperature limiting member 218 about its center axis 328 limits the motion permitted of stem assembly 220 about axis 328.

As detailed herein, stem assembly 220 includes ball 225 that transmits stem motion to upper disc 238 through extension 229. Ball 225 allows spherical rotation, while preventing lateral motion. Since valve assembly 210 only requires two degrees of freedom (temperature and volume), rotation about stem assembly 220 is prevented by operation of lateral extension 227 coupled to ball 225 that rides in the slot 314 in cooperating upper housing 216.

Lateral extension 227 has two motions in slot 314. The first motion is a pivot motion about its own axis 324. The second motion is a pivot motion about axis 326, which is substantially vertical, within slot 314, and which has a constant radius from the center of the ball 225. Through orientation of slot 314, these two motions may correspond directly to temperature and volume motion of valve disc 218.

While the pivoting movement of stem assembly 220 of valve assembly 210 is similar to the pivoting movement of stem assembly 120 of valve assembly 110 (FIG. 23), the extension 227 of stem assembly 220 is offset by 90° from extensions 27 of stem assembly 120. If the extension 227 is located in a side-to-side orientation relative to inlet ports 146a and 146b (FIG. 28), as opposed to a front-to-back orientation relative to inlet ports 146a and 146b and outlet port 148 (FIG. 23), the temperature will be directly related to the motion of the extension 227 in the slot 314. The flow rate control motion will translate to the rotation of the extension 227 about its own axis 324. As such, to limit the maximum temperature, the travel of extension 227 within the slot 314 is reduced or limited. The limiting member 218 includes inclined surface 294 that engages extension 227 on the ball 225. As the temperature limiting member 218 is rotated about axis 328 of the valve assembly 210, the point of inclined surface 294 that is engageable with the extension 227 is set at different heights and, thereby, limits the travel of the extension 227 in the slot 314. This, in turn, limits the motion of upper disc 238 relative to lower disc 244, including hot water inlet put 146a.

Teeth 290 of temperature limiting member 218 engage with corresponding teeth 316 on the upper housing 216. This engagement keeps the temperature limit device 218 from slipping under load and provides detents to indicate discrete adjustment positions. Flex arms 284 of temperature limiting member 218 provide a preload on the engaged teeth 290, 316 and to prevent temperature limiting member 218 from slipping due to vibration. This preload also gives the adjuster a tactile feedback to prevent over-correction of a temperature limiting member 218. The tab or indicator 292 of the temperature limiting member 218 also protrudes through the slot 320 of upper housing 216 and provides a visual indication to the user of the temperature setting. Marks may be provided on the upper housing 216 to provide reference points of the relative position of indicator 292 within slot 320.

Figure 29:
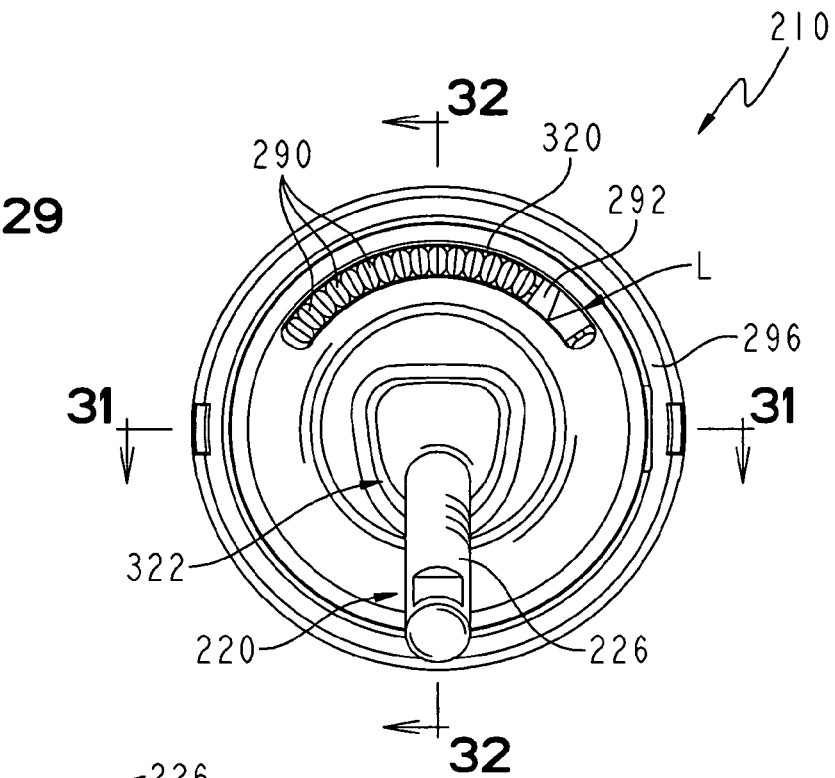
FIG. 29 is a top plan view of the valve assembly of FIG. 27, with the temperature limiting member shown in a low limit position and the stem shown in a fully-closed position.
Figure 30:
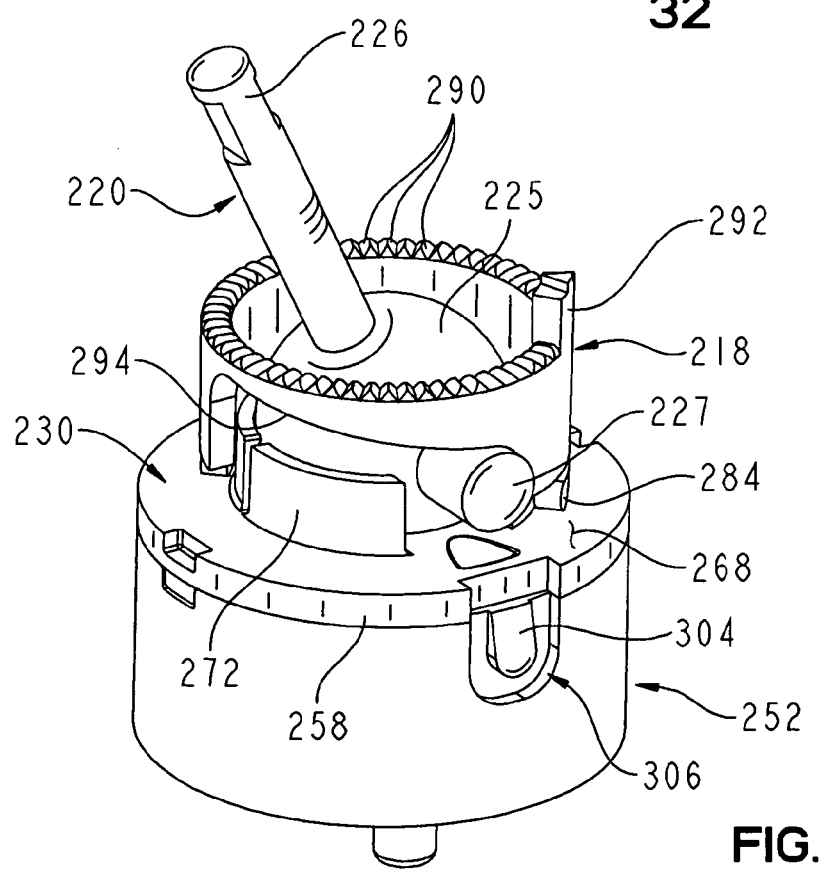
FIG. 30 is a perspective view of the valve assembly of FIG. 27, with the upper housing removed for clarity.

With further reference now to FIGS. 29, 30, and 35A-35C, valve assembly 210 is illustrated with the temperature limiting member 218 positioned in a low limit position "L". Indicator 292 in FIG. 29 shows the low limit position within slot 320 of upper housing 216. In FIGS. 29, 30, and 35A, stem assembly 220 is in a fully-closed position. As detailed above, this means that the upper disc 238 engages the lower disc 244 so that water does not flow from either hot or cold inlet ports 146a and 146b to outlet port 148. As shown in FIG. 35B, valve assembly 220 is moved to an open hot limit position. More-over, stem assembly 220 is pivoted about axis 324 to an open flow position and also pivoted about axis 326 to the temperature limit position as defined by the inclined surface 294 of temperature limiting device 218. In other words, stem assembly 220 is pivoted as far as possible to its hot, or left, position about axis 326 due to engagement of the extension 227 and inclined surface 294 of temperature limiting member 218. FIG. 35C illustrates the valve assembly 210 in an open cold limit position, where the valve assembly 220 is pivoted as far as possible to its cold, or right, position about axis 326 due to engagement between the extension 227 and base 258.

Figure 36:
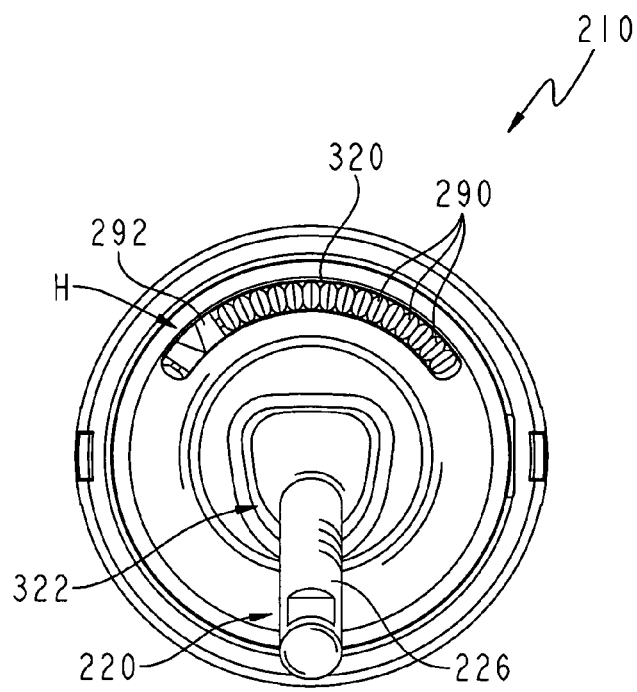
FIG. 36 is a top plan view of the valve assembly of FIG. 27, with the temperature limiting member shown in a high limit position and the stem shown in a fully-closed position.
Figure 37:
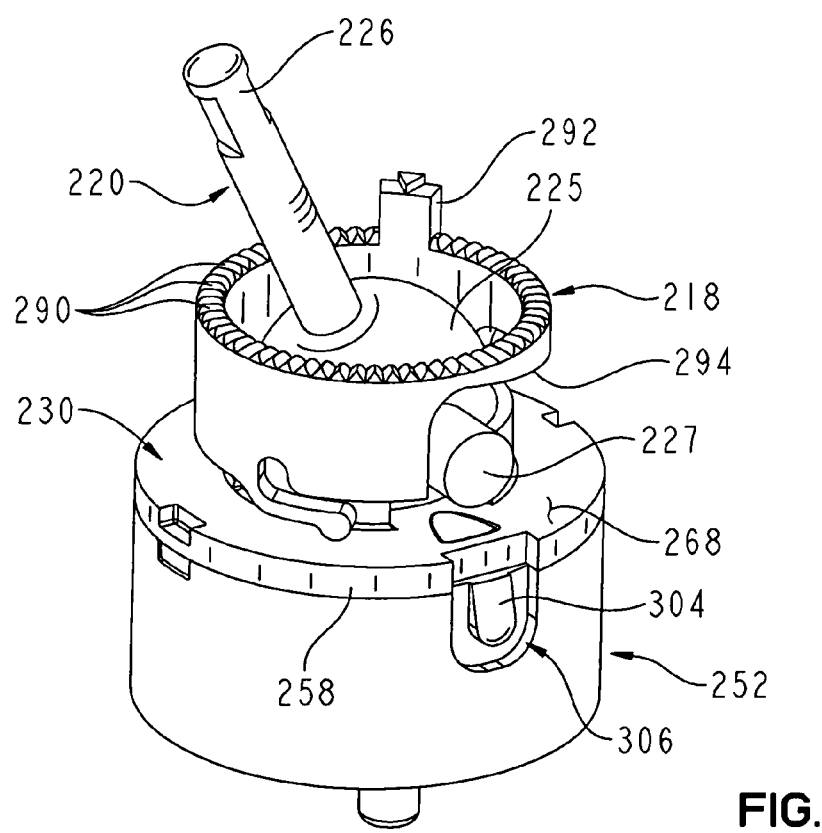
FIG. 37 is a perspective view of the valve assembly of FIG. 27, with the upper housing removed for clarity.

FIGS. 36-38D show valve assembly 210 with temperature limiting member 218 in a high limit position "H". Indicator 292 in FIG. 36 shows the high limit position within slot 320 of upper housing 216. In other words, temperature limiting member 218 has been rotated counter-clockwise by approximately 90 degrees from the position shown in FIGS. 29, 30, and 35A-35C. Such rotation is accomplished by pushing down on temperature limiting member 218 against the bias of arms 284, such that teeth 290 disengage from teeth 316 of upper housing 216. Temperature limiting member 218 is then free to be rotated by gliding surfaces 286 of arms 284 against slide surface 268 of coupling member 230, such that indicator 292 moves within arcuate slot 320.

FIGS. 36-38A illustrate stem assembly 220 in a fully-closed position. FIG. 38B shows stem assembly 220 in a mixed temperature position where water flows from both hot and cold inlet ports 146a and 146b to outlet port 148 of upper disc 244. FIG. 38C illustrates stem assembly 220 in an open hot limit position where maximum flow is permitted through hot water port to outlet 148. As clearly illustrated by comparing FIG. 38C to FIG. 35B, the stem in FIG. 38C has rotated further about axis 326 toward the hot water position, or to the left. This is because the point of contact between extension 227 and inclined surface 294 is higher in FIG. 38C than in FIG. 35B. As detailed above, in FIGS. 36-38D temperature limiting member 218 has been rotated counter-clockwise approximately 90° from the position shown in FIGS. 29, 30, and 35A-35C. FIG. 38D illustrates stem assembly 220 in an open cold limit position which is substantially the same as that position illustrated in FIG. 35C.

Although the invention has been described in detail with reference to certain preferred embodiments, variations and modifications exist within the spirit and scope of the invention as described and defined in the following claims.

The invention claimed is:

1. A valve assembly for controlling water flow in a faucet, the valve assembly including:
   a valve body including hot and cold water inlets and an outlet;
   a lower disc including first, second, and third ports corresponding to the hot and cold water inlets and the outlet, the lower disc supported by the valve body;
   an upper disc including upper and lower surfaces, the lower surface positioned in engagement with the lower disc and including an inner channel edge and an outer channel edge defining a closed peripheral channel for selective communication with the first, second, and third ports, the closed peripheral channel extending around a center portion of the lower surface and configured to mix hot water from the first port and cold water from the second port before reaching the third port, the center portion of the lower surface configured to selectively seal the first port and the second port from the third port; and
   a stem operably coupled to the upper disc and supported for pivoting movement about orthogonal axes extending within a plane parallel to the upper disc;
   wherein translational movement of the upper disc in a first direction moves the inner channel edge to change water flow rate through the third port, translational movement of the upper disc in a second direction perpendicular to the first direction moves the inner channel edge to change the proportion of water flow through the first and second ports, and translational movement in the first direction from the third port toward the first and second ports moves the center portion to close the first and second ports.

2. The valve assembly of claim 1, wherein at least one of the upper and lower discs is constructed of a metallic material.

3. The valve assembly of claim 1, wherein at least one of the upper and lower discs is constructed of a ceramic material.

4. The valve assembly of claim 1, wherein the upper and lower discs each define a substantially circular perimeter and the channel extends adjacent the circular perimeter.

5. The valve assembly of claim 4, wherein the channel includes a V-shaped portion.

6. The valve assembly of claim 1, wherein the upper disc includes an aperture extending therethrough.

7. The valve assembly of claim 1, wherein the channel extends circumferentially around the lower surface of the upper disc.

8. The valve assembly of claim 1, wherein the lower surface of the upper disc includes a central projection extending outwardly.

9. The valve assembly of claim 1, wherein the lower surface of the upper disc includes a center sealing portion configured to cooperate with the lower disc to form the channel.

10. The valve assembly of claim 1, wherein the lower surface of the upper disc includes an outer annular wall and a central portion that defines the channel, the central portion extending between the hot and cold water inlets.

11. The valve assembly of claim 1, further comprising:
   a temperature limiting member including an engagement surface configured to set a hot water limit for limiting movement of the stem assembly and the flow of hot water through the lower disc.

12. The valve assembly of claim 11, wherein the temperature limiting member is adjustable to change the position of the engagement surface relative to the stem assembly and thereby adjust the hot water limit.

13. The valve assembly of claim 11, wherein the temperature limiting member includes indexing members for setting the hot water limit.

14. The valve assembly of claim 1, wherein translational movement of the upper disc relative to the lower disc in a direction from the first port to the second port causes an increase in hot water flow through the first port, and translational movement of the upper disc relative to the lower disc in a direction from the second port to the first port causes an increase in cold water flow through the second port.

15. The valve assembly of claim 1, wherein movement of the stem in a first direction causes movement of the upper disc in a second direction opposite the first direction.

16. The valve assembly of claim 15, wherein movement of the stem in a direction toward the first port causes the upper disc to uncover the first port, and movement of the stem in a direction toward the second port causes the upper disc to uncover the second port.

17. The valve assembly of claim 16, further comprising a ball supported above the upper disc, and a knuckle extending downwardly from the ball, wherein the stem extends upwardly from the ball.

18. A valve assembly for controlling water flow in a faucet, the valve assembly including:
   a valve body including hot and cold water inlets and an outlet;
   a lower disc including first, second, and third ports corresponding to the hot and cold water inlets and the outlet, the lower disc supported by the valve body;
   an upper disc including upper and lower surfaces, the lower surface positioned in engagement with the lower disc and including an inner channel edge and an outer channel edge defining a closed peripheral channel for selective communication with the first, second, and third ports, the closed peripheral channel extending around a center portion of the lower surface and configured to mix hot water from the first port and cold water from the second port before reaching the third port, the center portion of the lower surface configured to selectively seal the first port and the second port from the third port; and
   a stem assembly including a ball supported for pivoting movement about a first axis and a second axis orthogonal to the first axis, a stem extending upwardly from the ball, and a knuckle extending downwardly from the ball and operably coupled to the upper disc;
   the stem assembly supported for pivoting movement about the first axis to cause the inner channel edge of the upper disc to move linearly in a first direction to change water flow rate through the third port, and supported for pivoting movement about the second axis to cause the inner channel edge of the upper disc to move linearly in a second direction perpendicular to the first direction to change the proportion of water flow through the first and second ports, wherein translational movement in the first direction from the third port toward the first and second ports moves the center portion to close the first and second ports.

19. The valve assembly of claim 18, wherein movement of the stem in a first direction causes movement of the upper disc in a second direction opposite the first direction.

20. The valve assembly of claim 18, wherein movement of the stem in a direction toward the first port causes the upper disc to uncover the first port, and movement of the stem in a direction toward the second port causes the upper disc to uncover the second port.

21. The valve assembly of claim 18, wherein at least one of the upper and lower discs is constructed of a metallic material.

22. The valve assembly of claim 18, wherein at least one of the upper and lower discs is constructed of a ceramic material.

23. The valve assembly of claim 18, wherein the upper and lower discs each define a substantially circular perimeter and the channel extends adjacent the circular perimeter.

24. The valve assembly of claim 23, wherein the channel includes a V-shaped portion.

25. The valve assembly of claim 18, wherein the upper disc includes an aperture extending therethrough.

26. The valve assembly of claim 18, wherein the channel extends circumferentially around the lower surface of the upper disc.

27. The valve assembly of claim 18, wherein the lower surface of the upper disc includes a central projection extending outwardly.

28. The valve assembly of claim 18, wherein the lower surface of the upper disc includes a center sealing portion configured to cooperate with the lower disc to form the channel.

29. The valve assembly of claim 18, wherein the lower surface of the upper disc includes an outer annular wall and a central portion that defines the channel, the central portion extending between the hot and cold water inlets.

30. The valve assembly of claim 18, further comprising:
   a temperature limiting member including an engagement surface configured to set a hot water limit for limiting movement of the stem assembly and the flow of hot water through the lower disc.

31. The valve assembly of claim 30, wherein the temperature limiting member is adjustable to change the position of the engagement surface relative to the stem assembly and thereby adjust the hot water limit.

32. The valve assembly of claim 30, wherein the temperature limiting member includes indexing members for setting the hot water limit.

\* \* \* \* \*